(12) United States Patent
Feng et al.

(10) Patent No.: US 8,427,443 B2
(45) Date of Patent: Apr. 23, 2013

(54) COORDINATE LOCATING METHOD, COORDINATE LOCATING DEVICE, AND DISPLAY APPARATUS COMPRISING THE COORDINATE LOCATING DEVICE

(75) Inventors: Yaojun Feng, Shen Zhen (CN); Xiuling Zhu, Tai Po (HK); Shou-Lung Chen, Shatin (HK); Kwan-Wah Ng, Kowloon Bay (HK)

(73) Assignee: Hong Kong Applied Science and Technology Research Institute Co. Ltd., Shatin, New Territories, Hong Kong (CN)

( * ) Notice: Subject to any disclaimer, the term of this patent is extended or adjusted under 35 U.S.C. 154(b) by 570 days.

(21) Appl. No.: 12/650,193

(22) Filed: Dec. 30, 2009

(65) Prior Publication Data

US 2011/0157026 A1 Jun. 30, 2011

(51) Int. Cl.
*G06F 3/41* (2006.01)

(52) U.S. Cl.
USPC .......................................... 345/173; 345/178

(58) Field of Classification Search .......... 345/156–158, 345/168–184; 178/18.01–18.04, 18.09; 361/679.01; 463/31, 37, 39, 43; 342/28, 107, 114; 455/456.1; 382/141; 348/152
See application file for complete search history.

(56) References Cited

U.S. PATENT DOCUMENTS

| | | | | |
|---|---|---|---|---|
| 4,941,182 A * | 7/1990 | Patel | | 382/141 |
| 5,525,764 A | 6/1996 | Junkins et al. | | |
| 7,084,806 B2 * | 8/2006 | Toguchi et al. | | 342/28 |
| 7,342,574 B1 | 3/2008 | Fujioka | | |
| 7,414,617 B2 | 8/2008 | Ogawa | | |
| 8,094,129 B2 * | 1/2012 | Izadi et al. | | 345/173 |
| 8,228,304 B2 * | 7/2012 | Morrison et al. | | 345/173 |
| 2004/0082342 A1 * | 4/2004 | Toguchi et al. | | 455/456.1 |
| 2004/0179100 A1 * | 9/2004 | Ueyama | | 348/152 |
| 2008/0122803 A1 * | 5/2008 | Izadi et al. | | 345/175 |
| 2009/0141006 A1 * | 6/2009 | Wen-Pen et al. | | 345/175 |
| 2010/0060613 A1 * | 3/2010 | Morrison et al. | | 345/175 |
| 2011/0098029 A1 * | 4/2011 | Rhoads et al. | | 455/418 |
| 2012/0075256 A1 * | 3/2012 | Izadi et al. | | 345/175 |

OTHER PUBLICATIONS

JP 2004-192065, Hirabayashi, Takeshi et al. Jul. 8, 2004.*
JP 2004-192065 Detail description, Hirabayashi, Takeshi et al. Jul. 8, 2004.*
JP 2004-192065 Drawings, Hirabayashi, Takeshi et al. Jul. 8, 2004.*

* cited by examiner

*Primary Examiner* — Prabodh M Dharia
(74) *Attorney, Agent, or Firm* — Merchant & Gould P.C.

(57) ABSTRACT

A coordinate locating device for a display apparatus is provided, which can have lower manufacturing costs and can locate the coordinates of a single or multiple objects. The coordinate locating device includes a light source configured to emit light, wherein said light source comprises a light emitting device, at least one reflector configured to reflect the light from the light source, and a detector configured to detect the light reflected by the at least one reflector, wherein the light source and the detector are disposed at different positions on the same edge of the coordinate locating device.

26 Claims, 31 Drawing Sheets

COORDINATE LOCATING METHOD, COORDINATE LOCATING DEVICE, AND DISPLAY APPARATUS COMPRISING THE COORDINATE LOCATING DEVICE

FIELD OF THE INVENTION

The invention relates generally to a coordinate locating device and, more particularly, to a coordinate locating device for a display apparatus.

BACKGROUND OF THE INVENTION

Various coordinate locating devices for locating the coordinates of an object are known. Some can detect the coordinates of an object from a pointing instrument, such as a pen, a fingertip, or a dedicated device. A user can input information with the pointing instrument accordingly.

Common techniques employed in conventional coordinate locating devices for locating the coordinates of an object include mechanical buttons, crossed light beams, acoustic surface waves, capacitance sensing, and resistive materials. Among these techniques, those employing crossed light beams are not limited by the display panel size and are therefore cost competitive.

For example, Yasuji Ogawa, U.S. Pat. No. 7,414,617 discloses a coordinate locating device for generating coordinates. The device comprises a pair of cameras positioned in an upper left position and an upper right position of a display.

Another example, Susumu Fujioka, U.S. Pat. No. 7,342,574, discloses a method for inputting information including coordinate data, comprising providing at least two cameras at respective corners of a display.

In another example, John L. Junkins, etc., U.S. Pat. No. 5,525,764 discloses a graphic input system comprising at least two primary scanning lasers for digitizing the coordinates of an object.

However, these conventional coordinate locating devices are all implemented with at least two light sources and two detectors (or two cameras). Moreover, since each light source and corresponding detector is disposed at the same position such as a corner of a display panel, only one shadow of the object can be formed by each set of light source and detector. The conventional coordinate locating devices are thus undesirably limited to determining the coordinate or gesture of a single object only and have limited applications.

SUMMARY OF THE INVENTION

In view of the above, a coordinate locating device is provided that requires lower manufacturing costs and can locate the coordinates of a single or multiple objects. Additionally, a coordinate locating method that can be applied to the coordinate locating device is also provided.

In one aspect, a coordinate locating device for a display apparatus is provided, comprising: a light source configured to emit light, wherein said light source comprises a light emitting device; at least one reflector configured to reflect the light from the light source; and a detector configured to detect the light reflected by the at least one reflector, wherein the light source and the detector are disposed at different positions on the same edge of the coordinate locating device.

Additionally, a display apparatus is also provided, comprising the coordinate locating device and a display panel, wherein the coordinate locating device is arranged surrounding the display panel.

In another aspect, a coordinate locating method is provided for a coordinate locating device having a light source, at least one reflector, and a detector, the method comprising: locating a first line between the light source and a first shadow cast by an object intruding the coordinate locating device and appearing on the at least one reflector; locating a second line between the detector and a second shadow cast by the object and appearing on the at least one reflector; and locating the coordinates of the object at a cross point of the first and second lines.

In further another aspect, a coordinate locating method is provided for a coordinate locating device having a first light source, a second light source, at least one reflector, and a detector, the method comprising: simultaneously turning on the first and second light sources to detect shadows cast by an object intruding the coordinate locating device and appearing on the at least one reflector; locating at least two lines of a plurality of lines, wherein each of the plurality of lines is between one of the first and second light sources and the detector, and one of the detected shadows; and determining the coordinates of the object to be at a cross point of the at least two lines.

In yet further another aspect, a coordinate locating method is provided for a coordinate locating device having a first light source, a second light source, at least one reflector, and a detector, the method comprising: simultaneously turning on the first and second light sources to detect a plurality of shadows cast by at least two objects intruding the coordinate locating device and appearing on the at least one reflector; locating a first group of lines according to a first group of shadows among the plurality of shadows; locating a second group of lines according to a second group of shadows different from the first group of shadows among the plurality of shadows; locating a group of possible coordinates according to the first and second groups of lines; locating a third group of lines according to the second group of lines and the group of possible coordinates; and determining the coordinates of the at least two objects by the third group of lines.

In still further another aspect, a coordinate locating method is provided for a coordinate locating device having a first light source, a second light source, at least one reflector, and a detector, the method comprising: turning on the first and second light sources by turns to respectively detect a first group of shadows and a second group of shadows cast by one or more objects intruding the coordinate locating device and appearing on the at least one reflector; locating a first group of lines according to the first group of shadows; locating a second group of lines according to the second group of shadows; determining the one or more coordinates of the one or more objects according to the number of shadows in the first and second groups of shadows by the first and second group of lines.

These and other features, aspects, and embodiments are described below in the section entitled "Detailed Description of the Invention."

BRIEF DESCRIPTION OF THE DRAWING

Features, aspects, and embodiments are described in conjunction with the attached drawings, in which.

DETAILED DESCRIPTION OF THE INVENTION

Figure 1A:
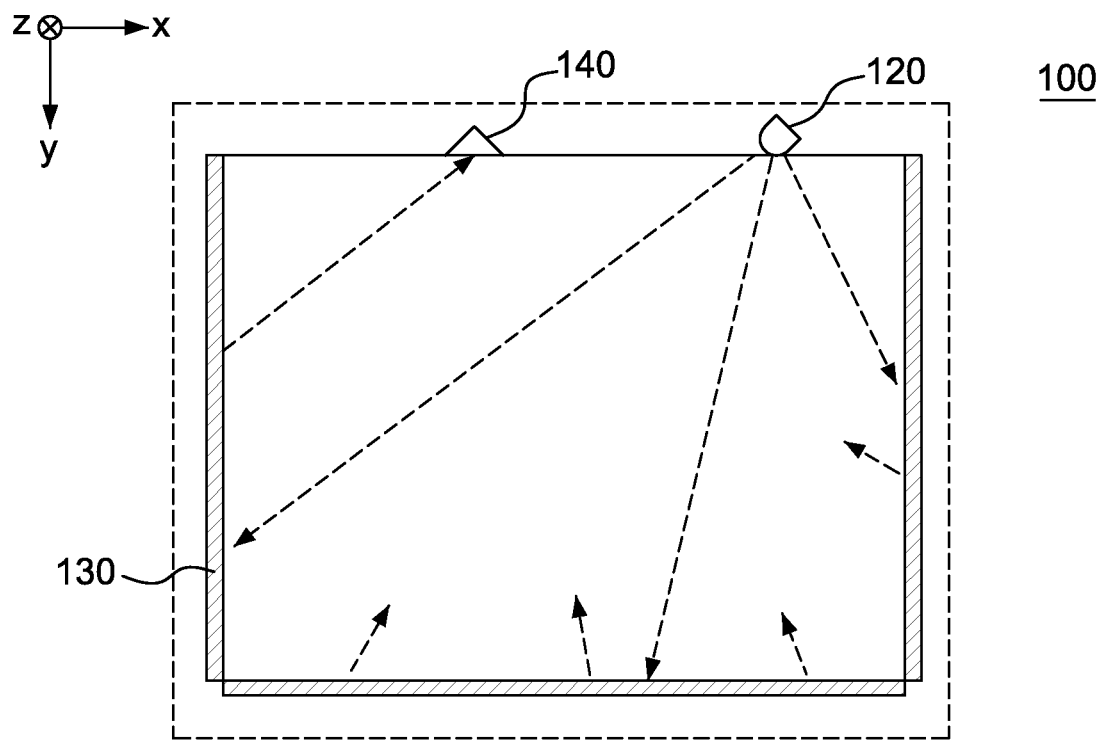
FIG. 1A is a schematic diagram showing the structure of a coordinate locating device in accordance with an embodiment.
Figure 1B:
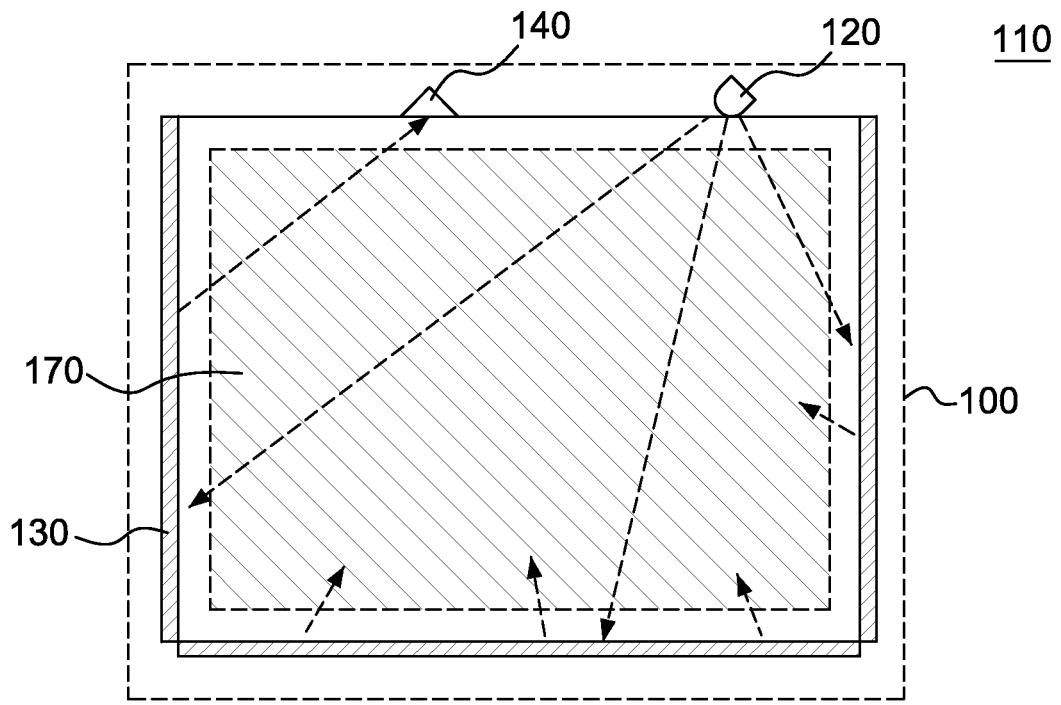
FIG. 1B is a schematic diagram showing the structure of a display apparatus employing the coordinate locating device of FIG. 1A in accordance with an embodiment.

FIG. 1A is a schematic diagram showing the structure of a coordinate locating device 100 in accordance with an embodiment; and FIG. 1B is a schematic diagram showing the structure of a display apparatus 110 employing the coordinate locating device 100 of FIG. 1A in accordance with an embodiment. As shown in FIG. 1A, the coordinate locating device 100 can include a light source 120 configured to emit light, a reflector 130 configured to reflect the light from the light source 120; and a detector 140 configured to detect the light reflected by the reflector 130. The light source 120 and the detector 140 are disposed at different positions on the same edge (such as the top edge as shown in FIG. 1A or right-hand side edge etc.) of the coordinate locating device 100. Preferably, the distance between the light source 120 and the detector 140 is larger than 2 cm along the direction of the edge.

The light source 120 is preferably an invisible light source, and more preferably an infrared (IR) light source. Specifically, the light source 120 can include a light emitting device configured to emit light, which can, for example be an LED, an IR LED, or a laser source. Optionally, the light source 120 can further include a light shaping device configured to shape the light emitted from the light emitting device. The light shaping device can, for example, include one or more scanning mirrors, one or more lens, or one or more diffractive optical elements configured to transform the light emitted from the light emitting device into divergent light. Particularly, in a specific embodiment where the light emitting device is implemented as a laser source, the light shaping device can preferably include Powell lens or diffraction optical elements which can transform the light emitted from the laser source into divergent light.

Figure 1C:
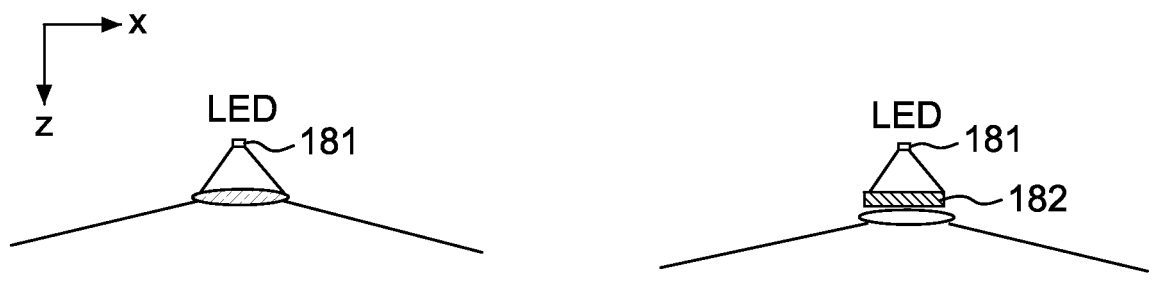
FIGS. 1C and 1D are diagrams illustrating the shaping effect of a light shaping device in accordance with a specific embodiment.
Figure 1D:

FIGS. 1C and 1D are diagrams illustrating the shaping effect of a light shaping device in accordance with a specific embodiment. In the embodiment, the light emitting device of the light source 120 of FIG. 1A is implemented as an LED 181 for purpose of illustration without limiting the disclosure. Referring to FIG. 1C, the light shaping device can include one or more first type of lenses 182 disposed adjacent to the LED 181, configured to expand the scanning angle of the LED 181 by diverging the light from the LED 181, such that more area on a plane (e.g., x-y plane) is illuminated. Referring to FIG. 1D, the light shaping device can, additionally or alternatively, include one or more second type of lenses 183 disposed adjacent to the LED 180, configured to converge the light from the LED 181, so as to increase light brightness on a plane (e.g., y-z plane).

The reflector 130 is preferably implemented as a diffusive reflector that can diffusively reflect the light from the light source. Additionally, more reflectors may also be implemented in other embodiments.

On the other hand, the detector 140, for example, can include an image sensor, a camera, or a photodiode (PD).

When an object (such as a finger, a pen etc.) intrudes the coordinate locating device 100, it blocks the light from the light source 120 and the light reflected by the reflector 130, causing shadows to be appearing on the reflector 140. The shadows of the object can then be detected by the detector 140, and the coordinates of the object can be located according to the shadows detected by the detector 140.

With the light source 120 and the detector 140 disposed at different positions, the coordinate locating device 100 is capable of locating the coordinates of an object intruding therein, even though the total number of the light source and the detector is fewer than that in conventional technologies which employ at least two light sources and at least two detectors, as is explained in details in the embodiments connected with FIGS. 2 and 3A-3C.

Additionally, the coordinate locating device 100 can further include an interface that is connectable to the display apparatus 110 such as that shown in FIG. 1B.

Referring to FIG. 1B, the display apparatus 110 can include a display panel 170, where an object to be located can move; and the coordinate locating device 100, which is arranged surrounding the display panel 170 so as to detect the coordinates of the object. When the object moves on or over the display panel 170 and therefore intrudes the coordinate locating device 100, it can block the light from the light source 120 and the light reflected by the reflector 130, causing shadows to be appearing on the reflector 130. The detector 140 of the coordinate device 100 can then detect the shadows of the object. The coordinates of the object can be located according to the detected shadows. According to the above embodiment, the display apparatus 110 can thus be used as a touch display apparatus.

Figure 2:
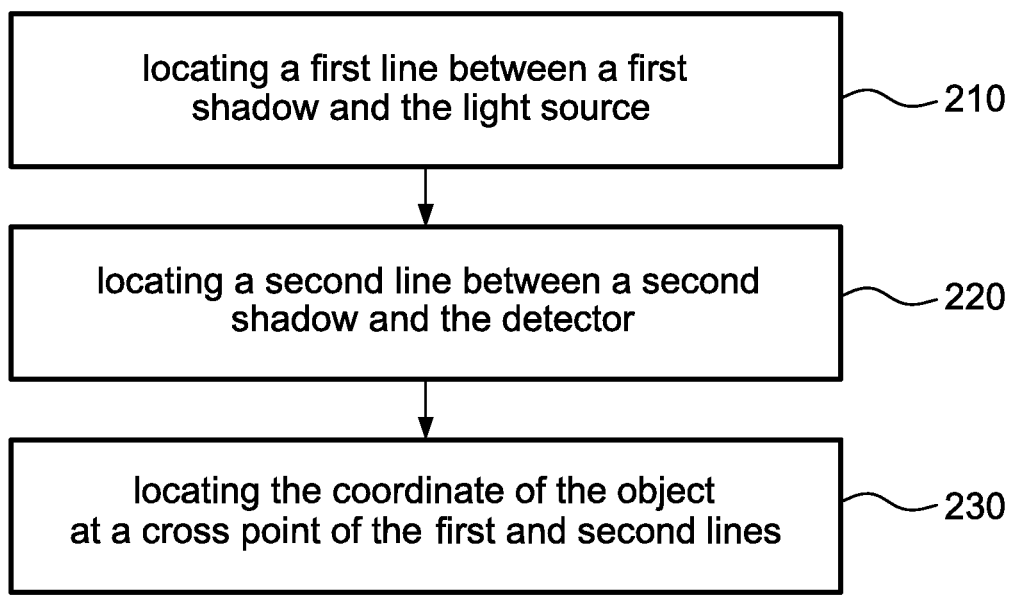
FIG. 2 is a flowchart showing the steps to locate the coordinates of an object intruding the coordinate locating device of FIG. 1A in accordance with an embodiment.
Figure 3A:
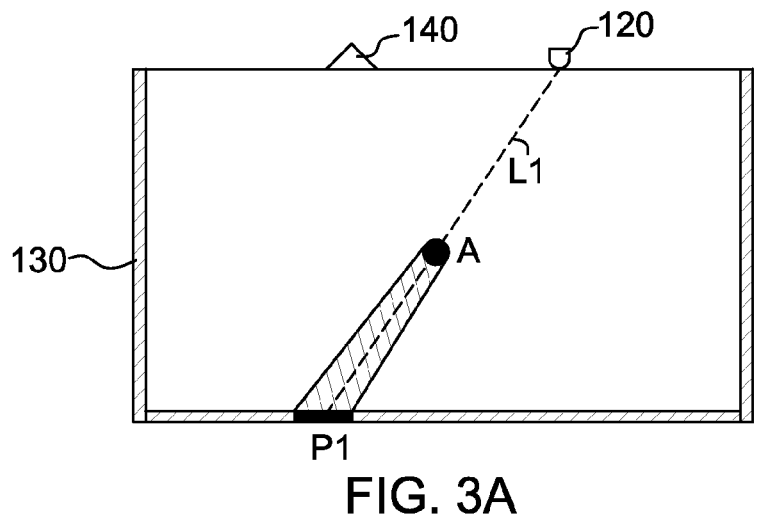
FIGS. 3A-3C are exemplary diagrams for explaining how the steps of FIG. 2 can be performed in accordance with a specific embodiment.
Figure 3B:
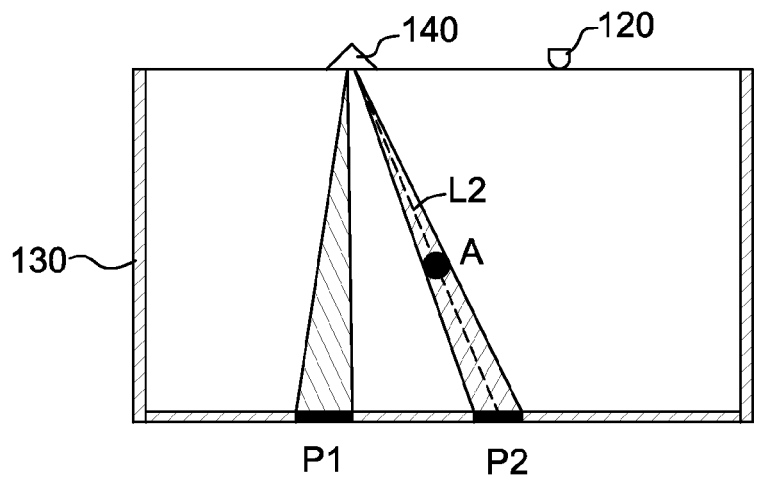
Figure 3C:
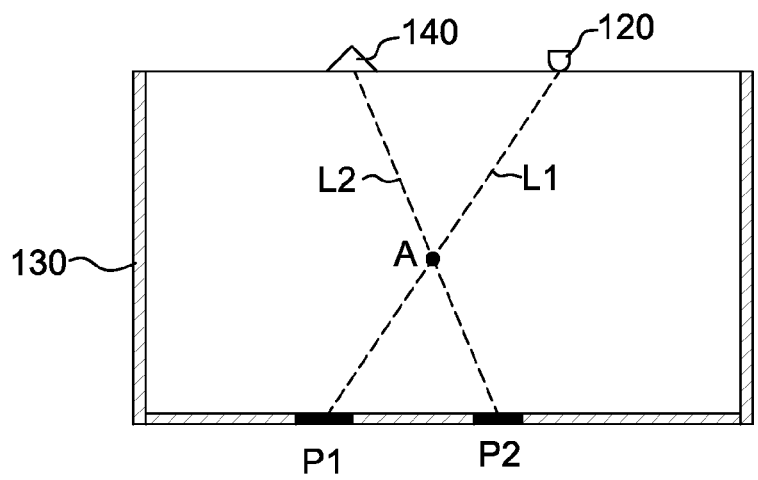

FIG. 2 is a flowchart showing the steps to locate the coordinates of an object intruding the coordinate locating device 100 of FIG. 1A in accordance with an embodiment. FIGS. 3A-3C are exemplary diagrams for explaining how the steps of FIG. 2 can be performed in accordance with a specific embodiment.

Referring first to FIG. 3A, when an object intruding the coordinate locating device 100 is located at a point "A," such as on or over the display panel 170 of FIG. 1B, a first shadow P1 of the object can be appearing on the reflector 130 along a first line L1 extending from the light source 120 and across the coordinate "A," because the light from the light source 120 along the first line L1 is blocked by the object at the coordinate "A." Next, referring to FIG. 3B, a second shadow P2 can be appearing on the reflector 130 along a second line L2 extending from the detector 140 and across the coordinate "A," because the light reflected by the reflector 130 along the second line L2 is blocked by the object at the coordinate "A." Accordingly, the coordinate "A" of the object is the cross point of the first and second lines L1 and L2, as shown in FIG. 3C.

Referring simultaneously to FIGS. 2 and 3A-3C, the process to locate the coordinates of the object can be started at step 210, wherein a first line L1 can be obtained between the light source 120 and the first shadow P1 cast by the object and appearing on the reflector 130. Next, the process proceeds to step 220, in which the second line L2 can be obtained between the detector 140 and the second shadow P2 formed by the object and appearing on the reflector 130. Finally, step 230 can be performed to locate the coordinates of the object at the cross point "A" of the first and second lines L1 and L2.

One unique technical feature of the coordinate locating device 100 lies in that the light source 120 and the detector 140 are placed at different positions rather than the same position as in conventional technology. As shown clearly in FIGS. 2 and 3A-3C, due to the disposition of the light source 120 and the detector 140 at different positions, two shadows P1 and P2 of an object rather than one shadow can be formed. The coordinate locating device 100 is able to locate the coordinates of the object based on the two shadows P1 and P2.

Figure 4A:
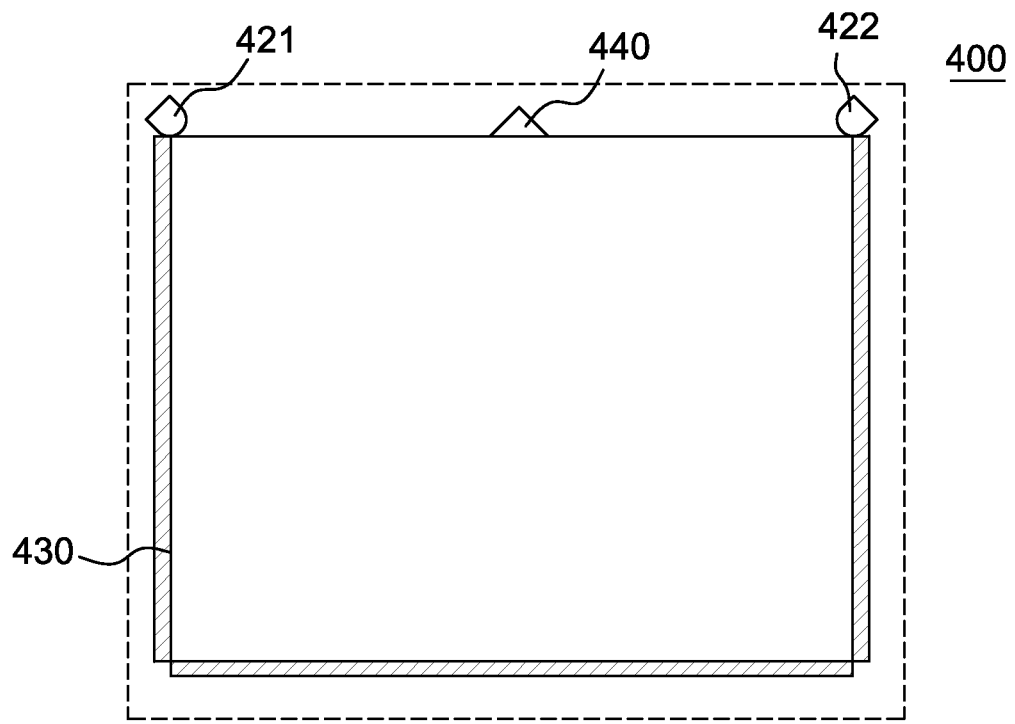
FIG. 4A is a schematic diagram showing the structure of a coordinate locating device in accordance with another embodiment.
Figure 4B:
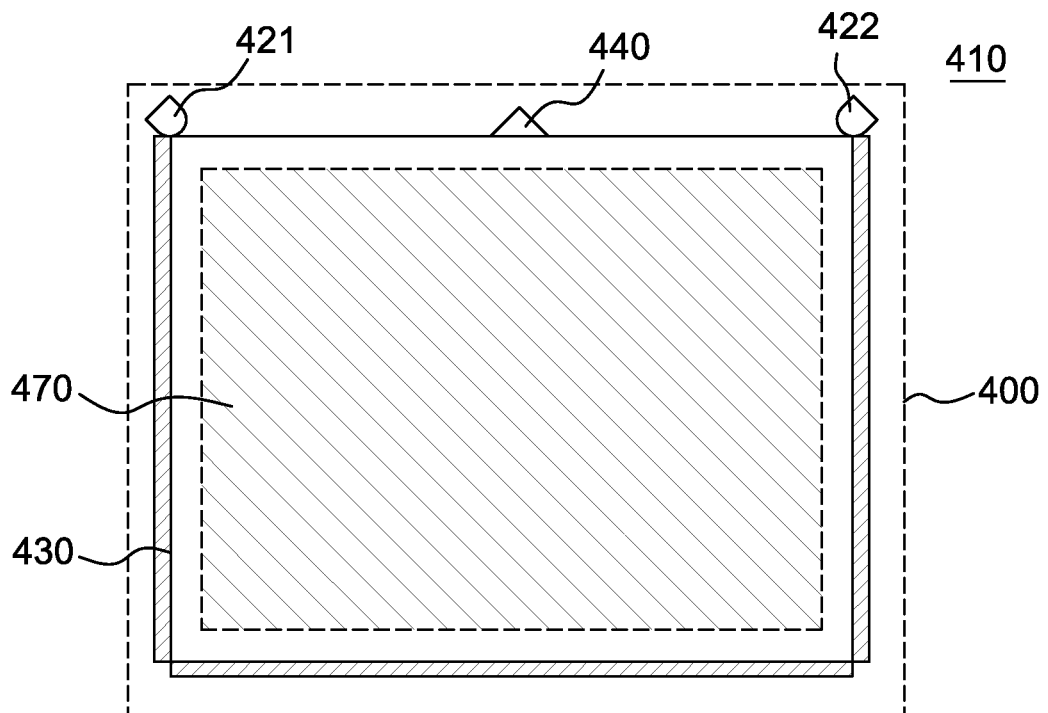
FIG. 4B is a schematic diagram showing the structure of a display apparatus employing the coordinate locating device of FIG. 4A in accordance with an embodiment.

FIG. 4A is a schematic diagram showing the structure of a coordinate locating device 400 in accordance with another embodiment; and FIG. 4B is a schematic diagram showing the structure of a display apparatus 410 employing the coordinate locating device 400 of FIG. 4A in accordance with an embodiment.

The coordinate locating device 400 of FIG. 4A differs from the coordinate locating device 100 of FIG. 1A only in that it includes more light sources: a first light source 421 and a second light source 422. Similarly, the coordinate locating device 400 also includes a reflector 430 configured to reflect the light from the first and second light sources 421 and 422; and a detector 440 configured to detect the light reflected by the reflector 430. Additionally, the first and second light sources 421 and 422 and the detector 440 are disposed at different positions on the same edge (such as the top edge as shown in FIG. 4A or right-hand side edge etc.) of the coordinate locating device 400. Preferably, the distance between the first light source 421 and the detector 440 is larger than 2 cm along the direction of the edge. Similarly, the distance between the second light source 422 and the detector 440 is preferably larger than 2 cm along the direction of the edge, too.

With such an implementation, the coordinate(s) of one or more objects intruding the coordinate locating device 400 can be obtained according to the shadows of the one or more objects that are appearing on the reflector 430 and then detected by the detector 440, even though the detector number is fewer than those in conventional technologies which employ at least two detectors.

Similarly, in FIG. 4B, the display apparatus 410 can include a display panel 470, where an object to be located can move, and the coordinate locating device 400 is arranged surrounding the display panel 470. When one or more objects move on or over the display panel 470, the one or more objects can block the light from the first and second light sources 421 and 422 and the light reflected by the reflector 430, causing shadows to be appearing on the reflector 130. The detector 440 of the coordinate locating device 400 can then detect the shadows of the one or more objects. The coordinate(s) of the one or more objects can thus be located according to the detected shadows.

Figure 5:
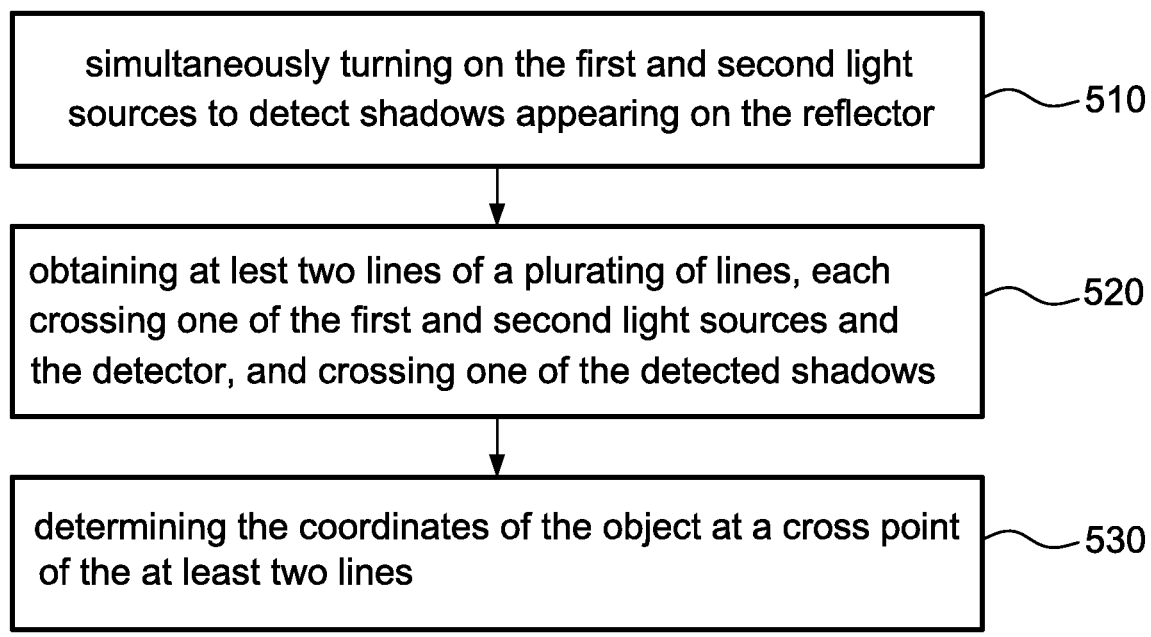
FIG. 5 is a flowchart showing the steps to locate the coordinates of an object intruding the coordinate locating device of FIG. 4A in accordance with an embodiment.
Figure 6:
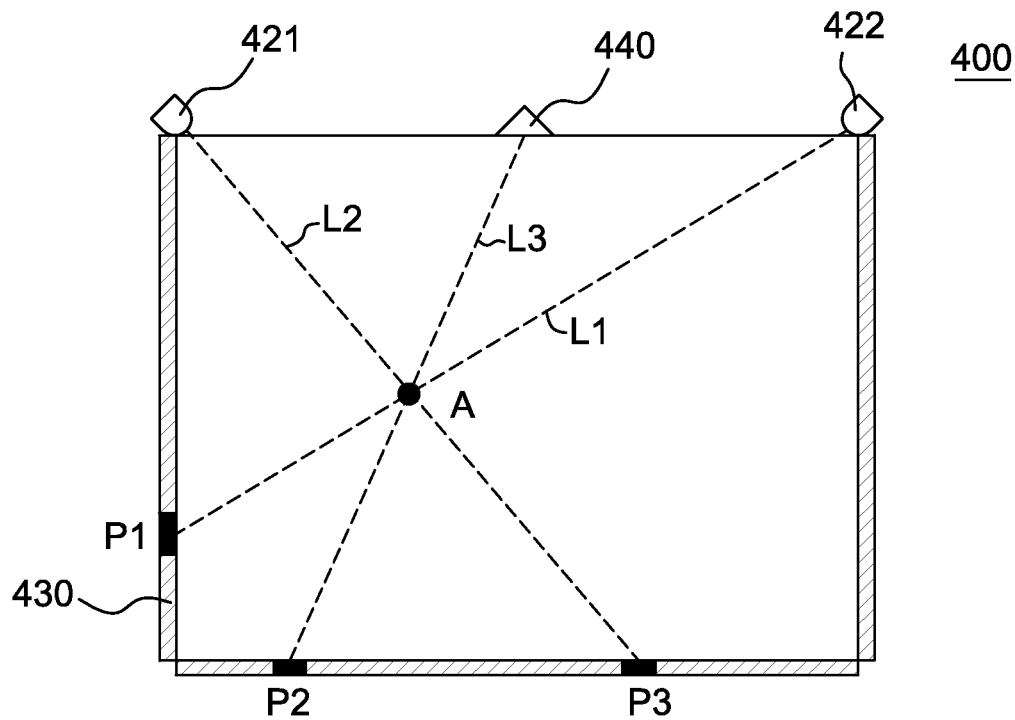
FIG. 6 is an exemplary diagram for explaining how the steps of FIG. 5 can be performed in accordance with a specific embodiment.

FIG. 5 is a flowchart showing the steps to locate the coordinates of an object intruding the coordinate locating device 400 of FIG. 4A in accordance with an embodiment. FIG. 6 is an exemplary diagram for explaining how the steps of FIG. 5 can be performed in accordance with a specific embodiment.

Referring to both FIGS. 5 and 6, the locating process of FIG. 5 can be stared at step 510, where the first and second light sources 421 and 422 are simultaneously turned on, causing three shadows P1, P2, and P3 of the object to be appearing on the reflector 430. The three shadows P1-P3 can then be detected by the detector 440.

Next, in step 520, at least two of a plurality of lines can be obtained, wherein each of the plurality of lines can be obtained between one of the first light source 421, the second light source 422, and the detector 440, and one of the detected shadows P1-P3. Specifically, the plurality of lines can include a first line L1 located between the second light source 422 and a first shadow P1 that is most adjacent to the first light source 421, a second line L2 located between the first light source 421 and a third shadow P3 that is most adjacent to the second light source 422, and a third line L3 located between the detector 440 and a second shadow P2 among the detected shadows P1-P3 other than the first and third shadows P1 and P3. In summary, the at least two lines can be lines L1 and L2, lines L2 and L3, lines L1 and L3, or lines L1-L3.

Next, in step 530, the coordinates of the object can be determined to be at a cross point "A" of the at least two lines L1 and L2, lines L2 and L3, lines L1 and L3, or lines L1-L3 as shown in FIG. 6.

Figure 7:
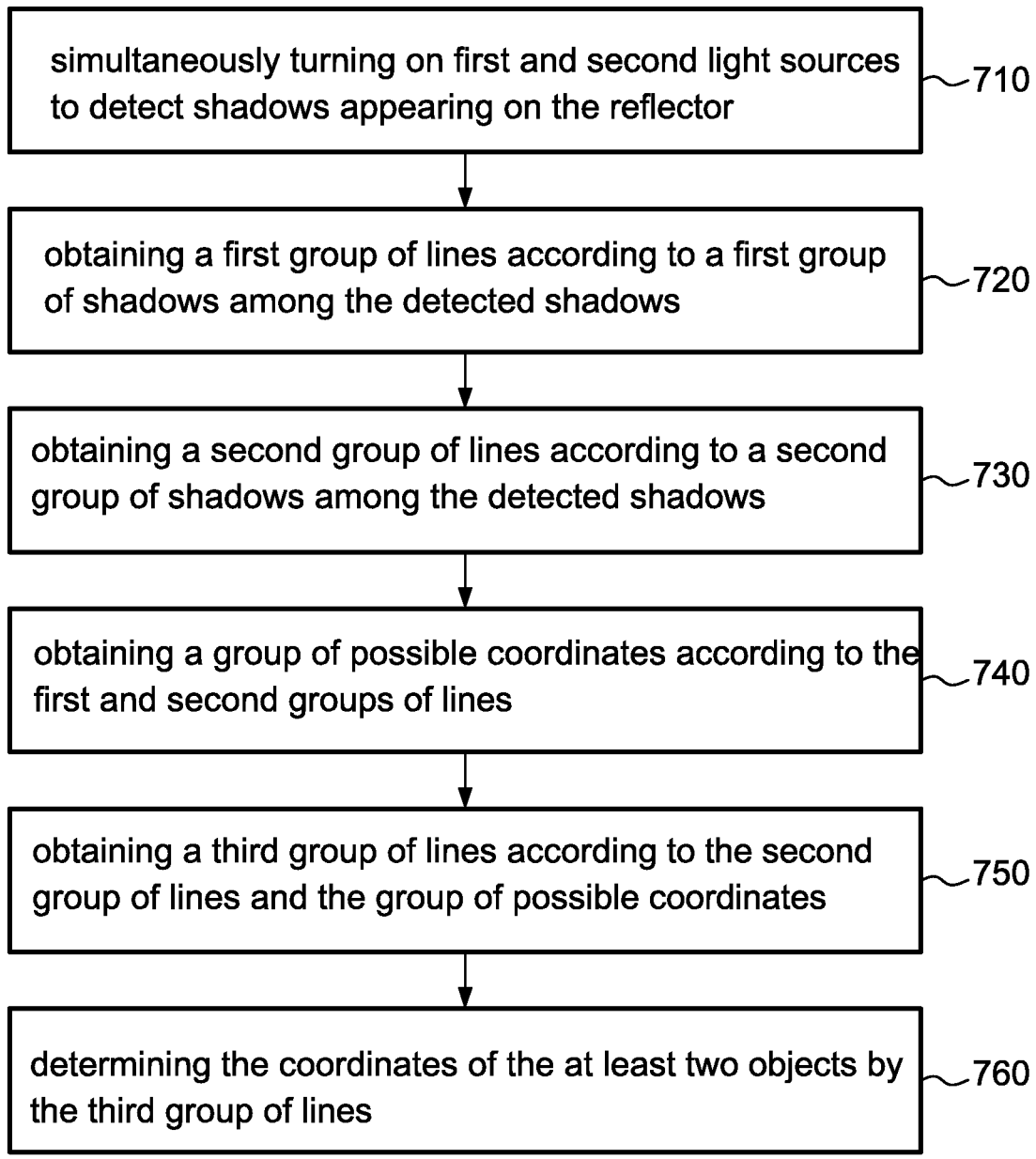
FIG. 7 is a flowchart showing the steps to locate the coordinates of at least two objects intruding the coordinate locating device of FIG. 4A in accordance with an embodiment.

FIG. 7 is a flowchart showing the steps to locate the coordinates of at least two objects intruding the coordinate locating device 400 of FIG. 4A in accordance with an embodiment.

As shown, the process of FIG. 5 is started at step 510, where the first and second light sources 421 and 422 are simultaneously turned on and shadows of the two objects appearing on the reflector 430 can be detected by the detector 440.

Figure 8A:
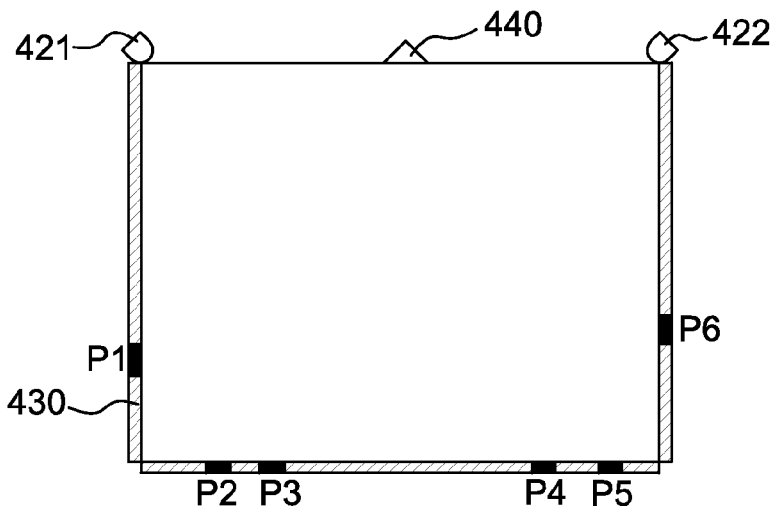
FIGS. 8A-8C are exemplary diagrams respectively showing different shadow configurations with 6, 5, and 3 shadows, respectively.
Figure 8B:
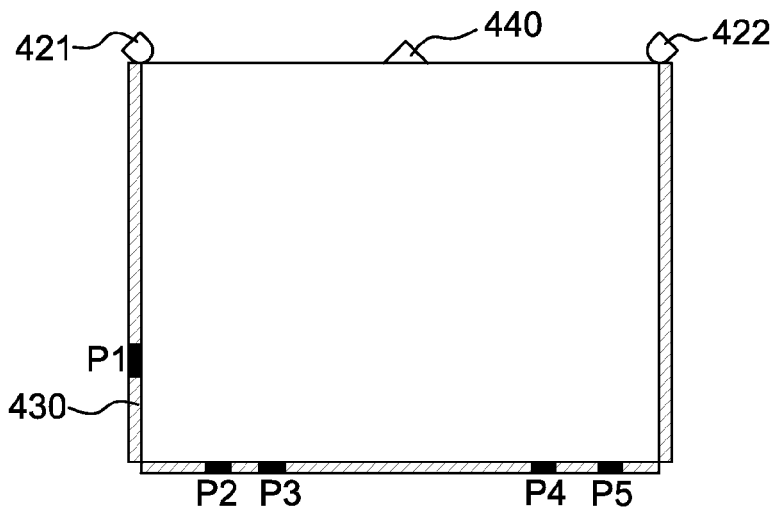
Figure 8C:
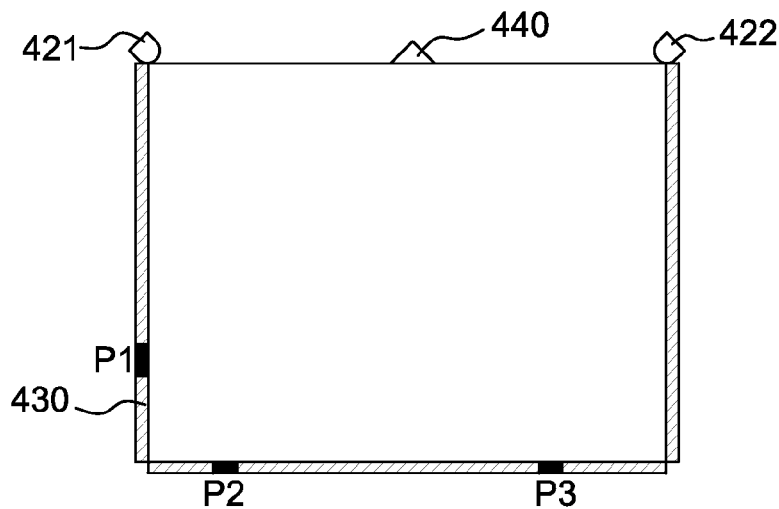

It is noted that different numbers of shadows of two objects may be formed and detected in step 710. Generally, 6 shadows can appear on the reflector 430: three cast by one object and three cast by the other object. However, in some cases some of the 6 shadows may be coincidentally overlapped, and consequently, 6, 5, or 3 shadows can be detected by the detector 440, as shown in FIGS. 8A-8C, which are exemplary diagrams respectively showing different shadow configurations with 6, 5, and 3 shadows, respectively. The following steps of FIG. 7 are exemplarily described for the shadow configuration with "6-shadows" as shown in FIG. 8A, but they can be readily applied by analogy to shadow configurations with "5-shadows" and "3-shadows" as shown in FIGS. 8B and 8C.

Figure 9A:
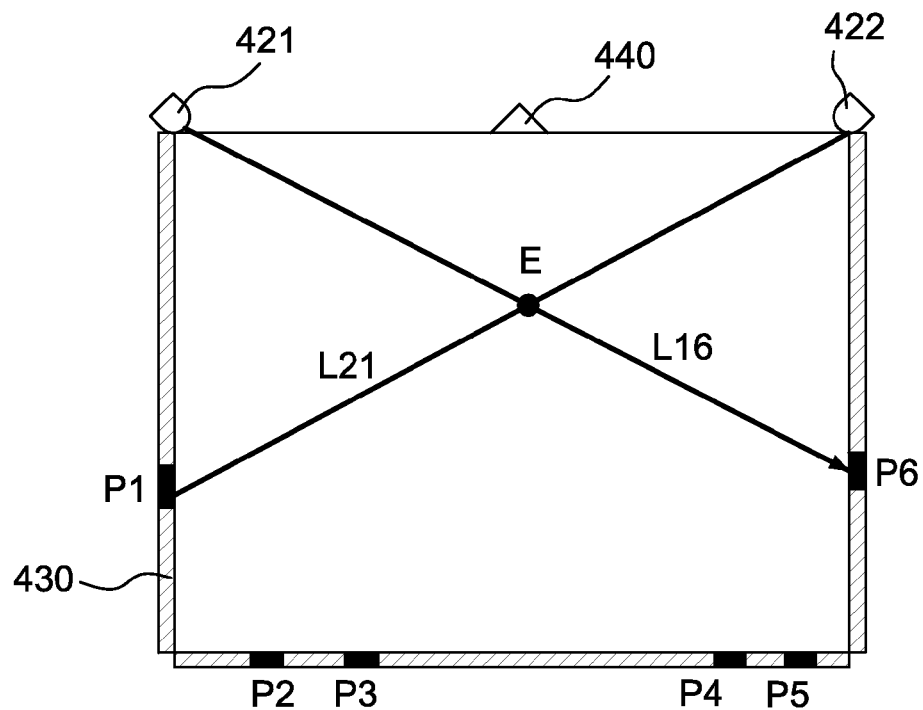
FIGS. 9A-9B are exemplary diagrams explaining how a step of FIG. 7 can be performed in accordance with a specific embodiment.

The locating process then enters step 720, where a first group of lines are obtained according to a first group of shadows among the detected shadows such as P1-P6 of FIG. 8A. Referring to FIG. 9A, an exemplary diagram explaining how step 720 can be performed in accordance with a specific embodiment, the first group of shadows include shadows P1 and P6, which are most adjacent to the first light source 421 and most adjacent to the second light source 422, respectively. Additionally, the first group of lines can include one line L16 located between the first light source 421 and the shadow P6, and one line L21 located between the second light source 422 and the shadow P1.

As shown clearly in FIG. 9A, the two objects must both be located on the side (e.g., the left side in FIG. 7A) of the line L16 opposite to the side where the second light source 422 is located, or otherwise a shadow other than the shadow P6 would appear to be more adjacent to the second light source 422 than the shadow P6. Similarly, the two objects must both be located on the side (e.g., the right side in FIG. 7A) of the line L21 opposite to the side where the first light source 421 is located, or otherwise a shadow other than the shadow P1 would appear to be more adjacent to the first light source 421 than the shadow P1.

Figure 9B:
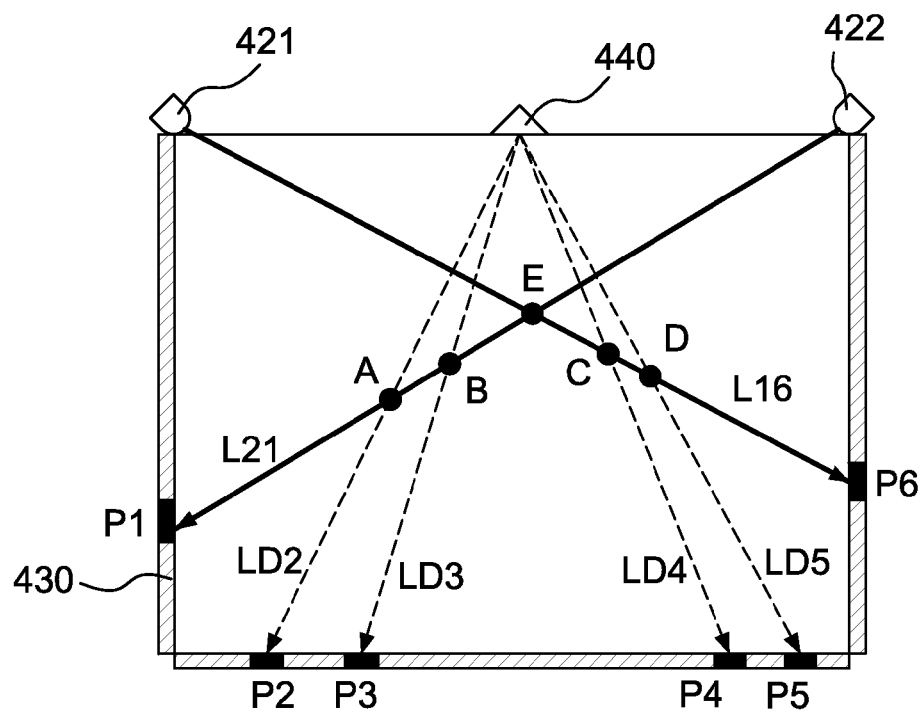

Next, the process proceeds to step 730, where a second group of lines are obtained according to a second group of shadows different from the first group of shadows. Referring to FIG. 9B, an exemplary diagram explaining how step 730 can be performed in accordance with a specific embodiment, the second group of shadows include the middle shadows P2-P4 other than the shadows P1 and P6. Additionally, the second group of lines includes lines LD2-LD5, located between the detector 440 and the middle shadows P2-P5, respectively.

Next, in step 740, a group of possible coordinates of the two objects can be obtained according to the first and second groups of lines. Referring to FIG. 9B, which also explains how step 740 can be performed in accordance with a specific embodiment, the possible coordinates include a first cross point E of the first group of line L16 and L21, and a plurality of second cross points "A," "B," "C," and "D" of the first group of lines L16 and L21 and the second group of lines LD2-LD5, all lying on the line "P1-E-P6." The first cross point "E" and the second cross points "A"-"D" are possible coordinates because at least one of the two objects must be located on at least one of them.

Next, the process proceeds to step 750, where a third group of lines are obtained according to the second group of lines LD2-LD5 and the group of possible coordinates "A"-"E" that are obtained in steps 730 and 740, respectively.

Figure 10:
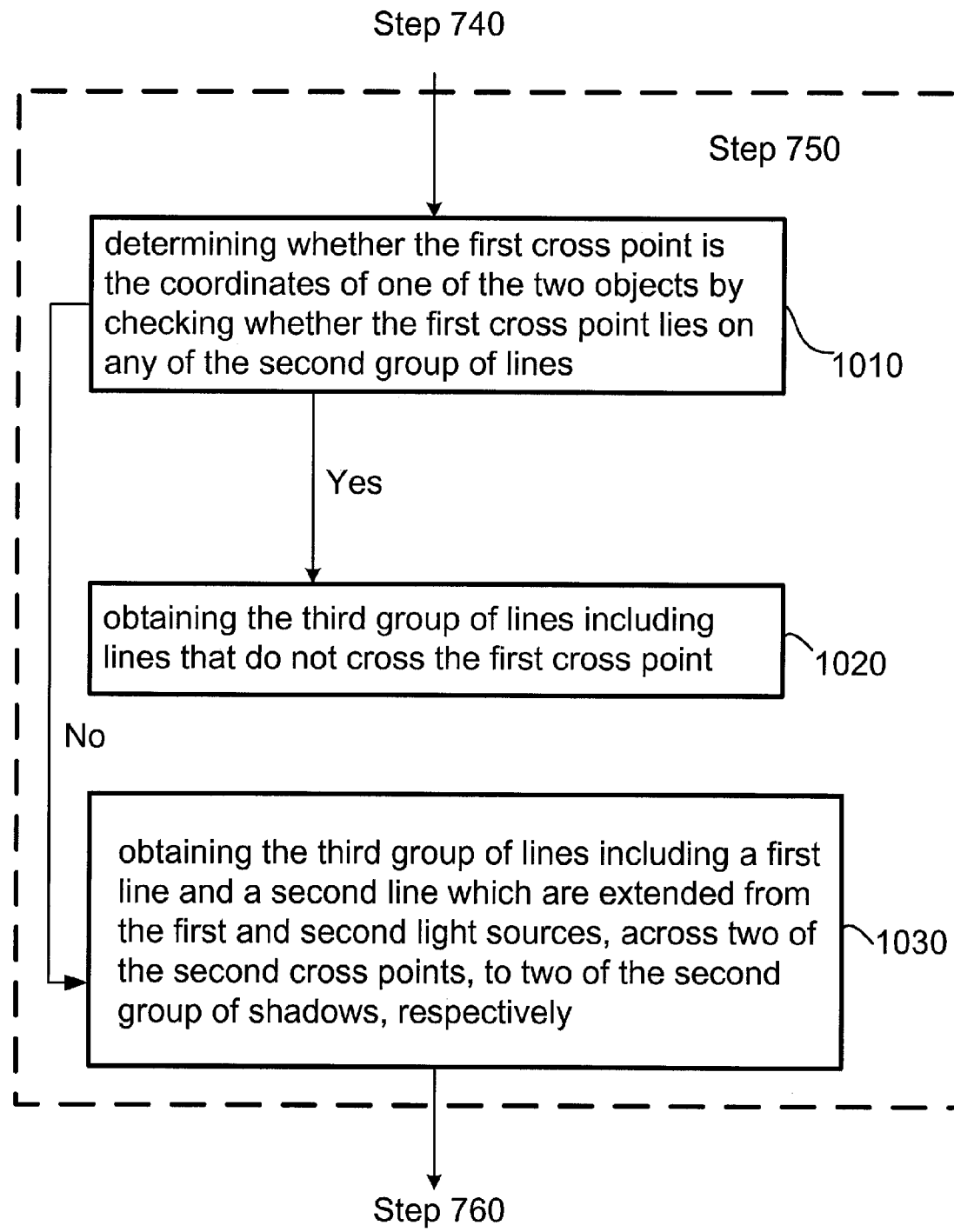
FIG. 10 is a flowchart showing details of another step of FIG. 7 in accordance with a specific embodiment.
Figure 11A:
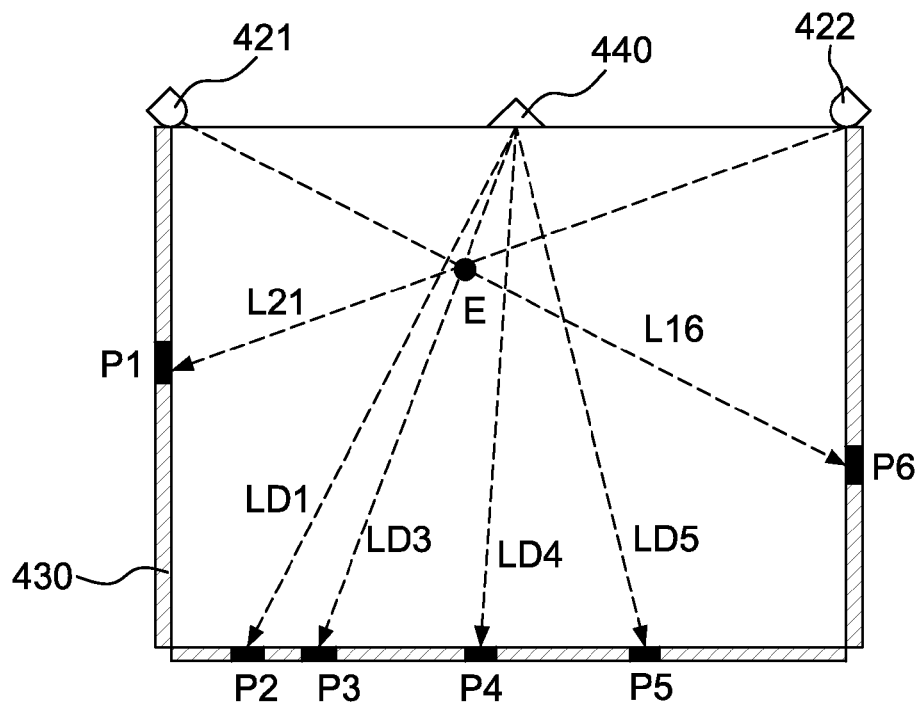
FIGS. 11A and 11B are two exemplary diagrams having different shadow configurations corresponding to negative and affirmative determinations, respectively.
Figure 11B:
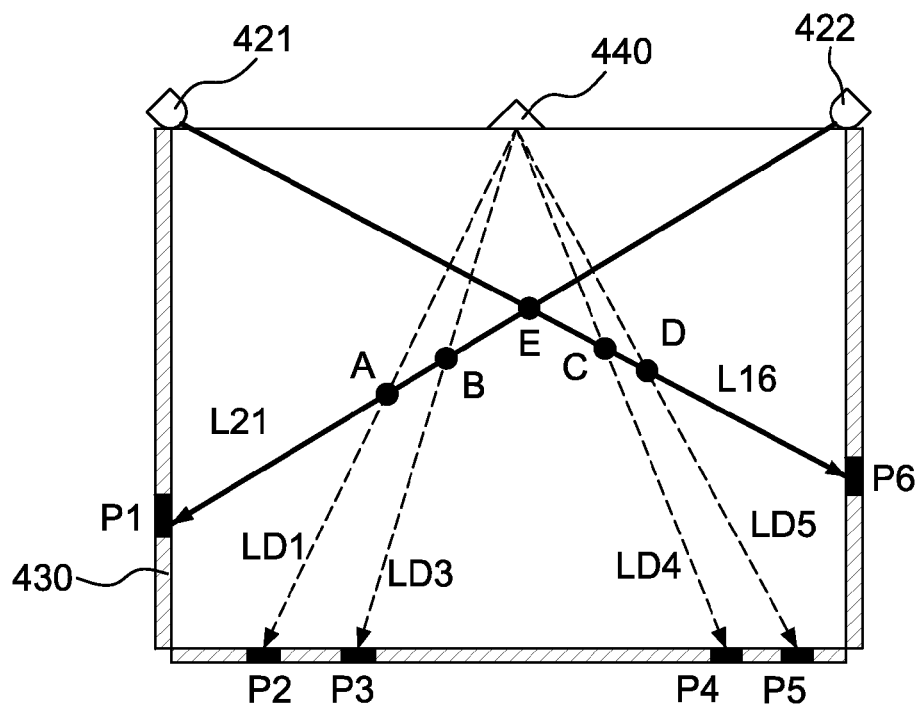

FIG. 10 is a flowchart showing details of step 750 of FIG. 7 in accordance with a specific embodiment. As shown, step 750 can be started at step 1010 to determine whether the first cross point "E" of the first group of lines L16 and L21 is the location of one of the two objects, by checking whether the first cross point "E" lies on any of the second group of lines LD2-LD5. FIGS. 11A and 11B are two exemplary diagrams having different shadow configurations corresponding to negative and affirmative determinations, respectively. Specifically, if the determination is affirmative ("Yes"), that is, the first cross point "E" lies on one of the second group of lines LD2-LD5, such as LD3 shown in FIG. 11A, then the first cross point "E" is determined to be the location of one of the two objects, and the process of step 740 proceeds to step 1020, after which the location of the other object can be determined. Contrarily, if the determination is negative ("No"), that is, the first cross point "E" does not lie on any of the second group of lines LD2-LD5 as shown in FIG. 11B, then the first cross point "E" is determined not to be the location of any one of the two objects, and the process of step 740 proceeds to step 1030, after which the coordinates of the two objects can be located.

Figure 12A:
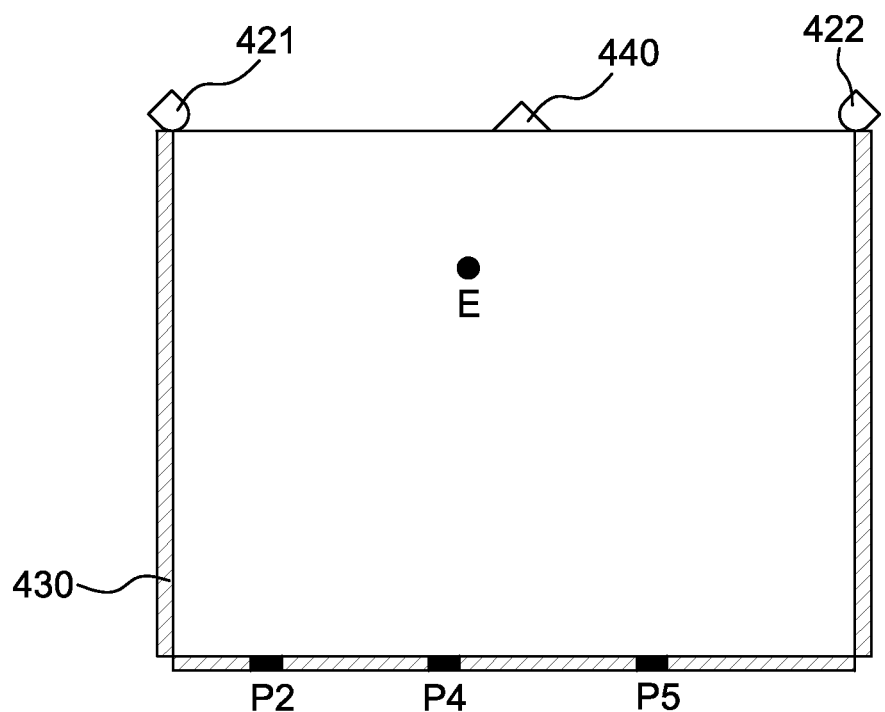
FIGS. 12A and 12B are diagrams exemplarily illustrating how step 1020 in FIG. 10 can be performed in accordance with a specific embodiment.
Figure 12B:
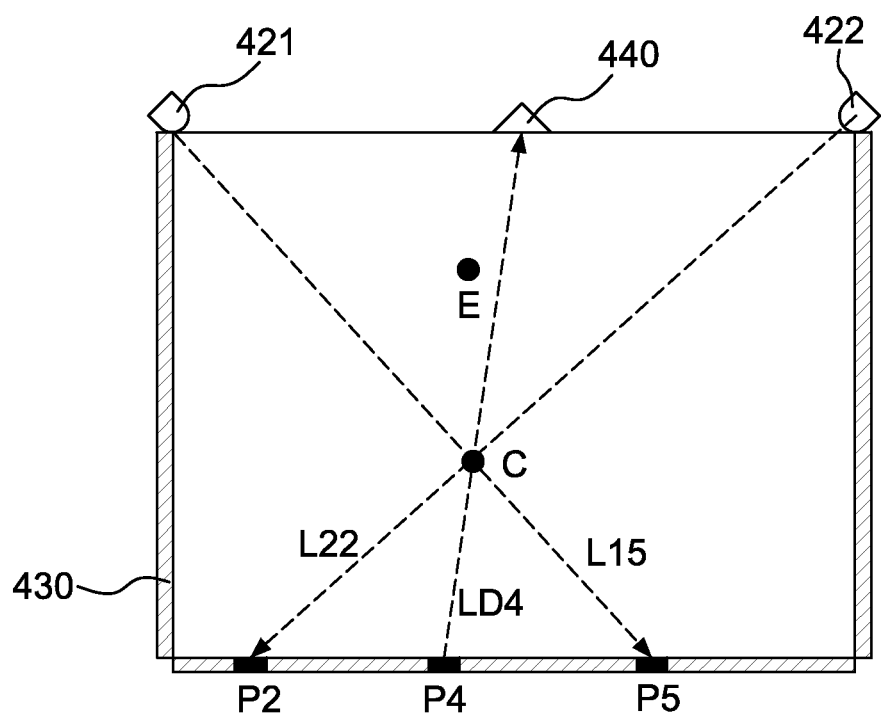

In step 1020, the third group of lines can be obtained, including at least two lines not crossing the first cross point "E." FIGS. 12A and 12B are diagrams exemplarily illustrating how step 1020 can be performed in accordance with a specific embodiment. First, referring to FIG. 12A, the shadows generated by the object located at the coordinate "E," i.e., the shadows P1, P6, and P3 located on the lines crossing the first crossing point "E" in FIG. 11A, can be deleted. Next, the third group of lines can then be obtained to include lines that do not cross the first cross point "E," which, for example as shown in FIG. 12B, can include a first line L15 located between the first light source 421 and the shadow P5 most adjacent to the second light source 422 in the remaining shadows P2, P4, and P5, a second line L22 located between the second light source 422 and the shadow P2 most adjacent to the first light source 421 in the remaining shadows P2, P4, and P5, and a third line LDC between the detector 440 and the middle shadow P4 in the remaining shadows P2, P4, and P5. Accordingly, the process of locating the third group of lines in step 750 of FIG. 7 can be completed.

On the other hand, after the first cross point "E" is determined not to be the location of any one of the two objects, the procedure enters step 1030, where it can be preliminarily estimated that the two objects must be located on a line "P1-E-P6" that crosses the shadow P1, a cross point E of the first group of lines L16 and L21, and the shadow P6. Accordingly, in step 1030, the third group of lines can be obtained to include a first line extended from one of the first and second light sources 421 and 422, across one of the group of possible coordinates "A"-"E", to one shadow of the second group of shadows P2-P5, and a second line extended from the other of the first and second light sources 421 and 422, across another of the group of possible coordinates "A"-"E", to another shadow of the second group of shadows P2-P5.

Figure 13:
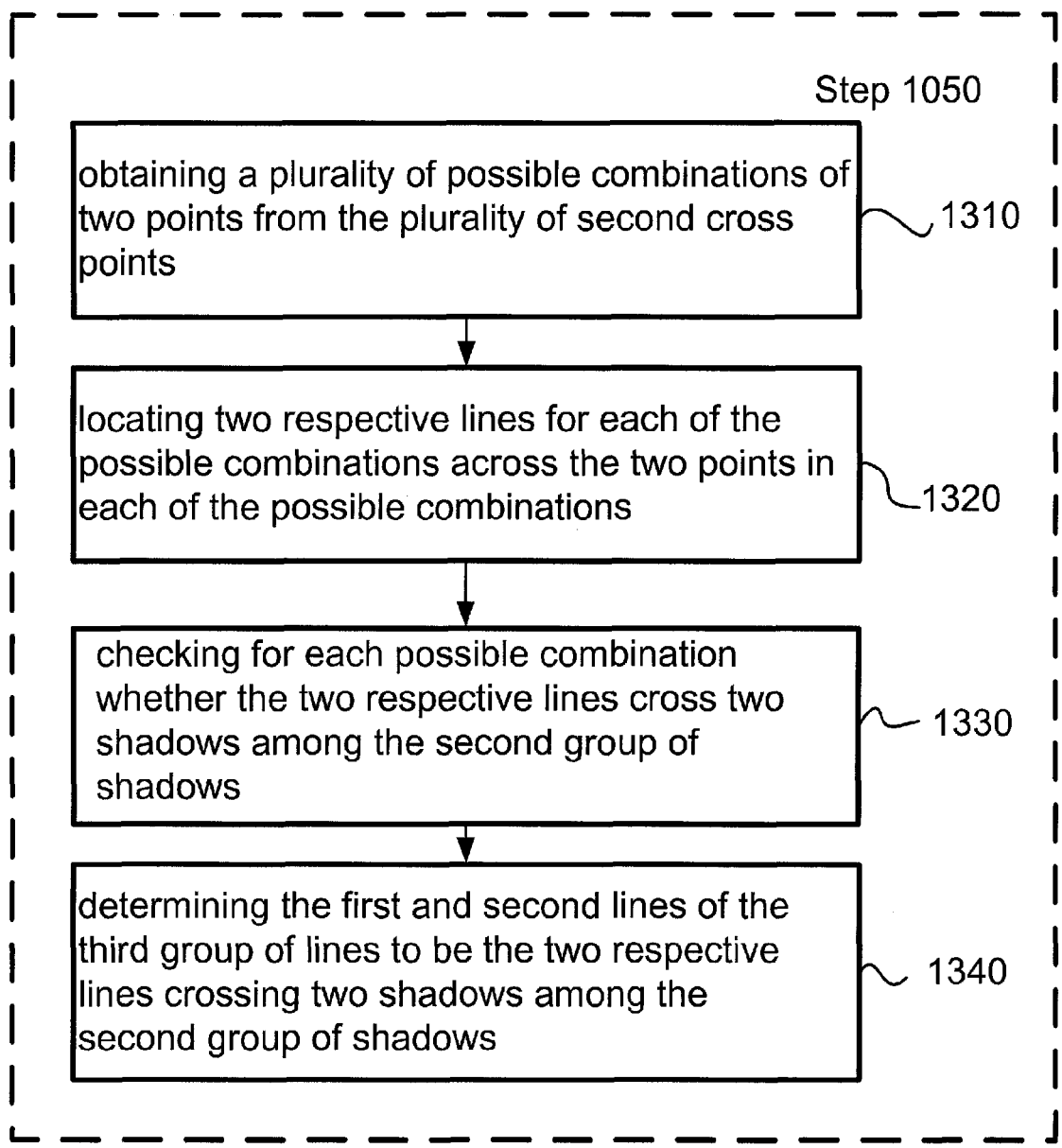
FIG. 13 is a flowchart showing details of a step of FIG. 10 in accordance with a specific embodiment.

FIG. 13 is a flowchart showing details of step 1030 of FIG. 10 in accordance with a specific embodiment. As shown, step 1030 can be started at step 1030 by obtaining all possible combinations of two cross points from the second cross points "A"-"D." Referring to FIG. 11B, each of the possible combinations may include two points respectively located on lines L16 and L21 of the first group of lines. Accordingly, four possible combinations can be obtained: "A+C," "A+D," "B+C," and "B+D."

Figure 14A:
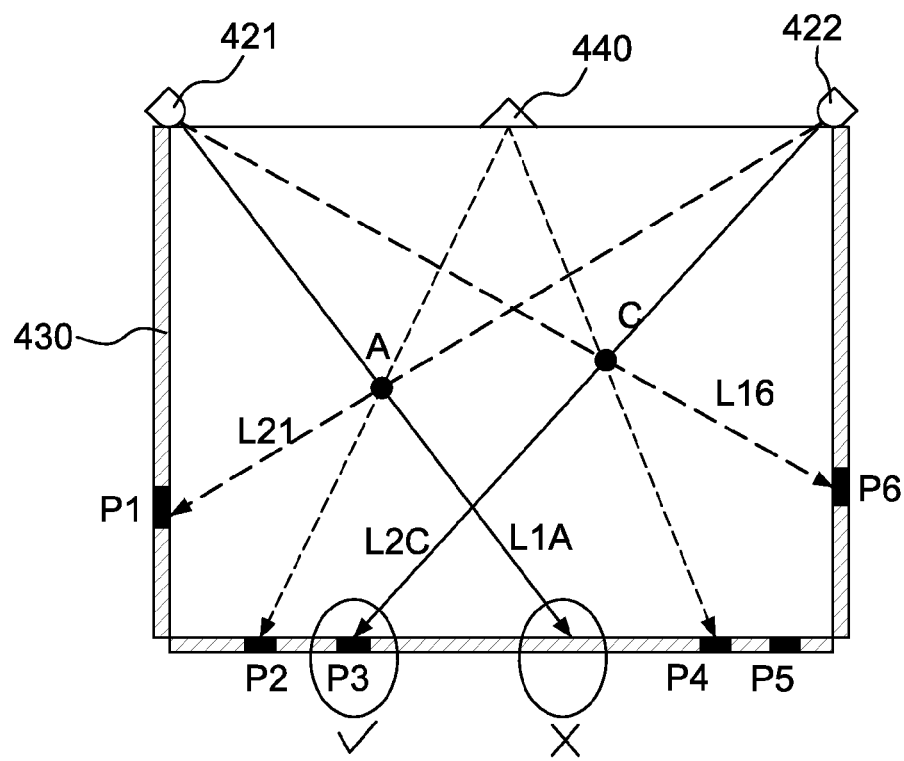
FIGS. 14A and 14B are exemplary diagrams explaining how a step of FIG. 13 can be performed in accordance with a specific embodiment.
Figure 14B:
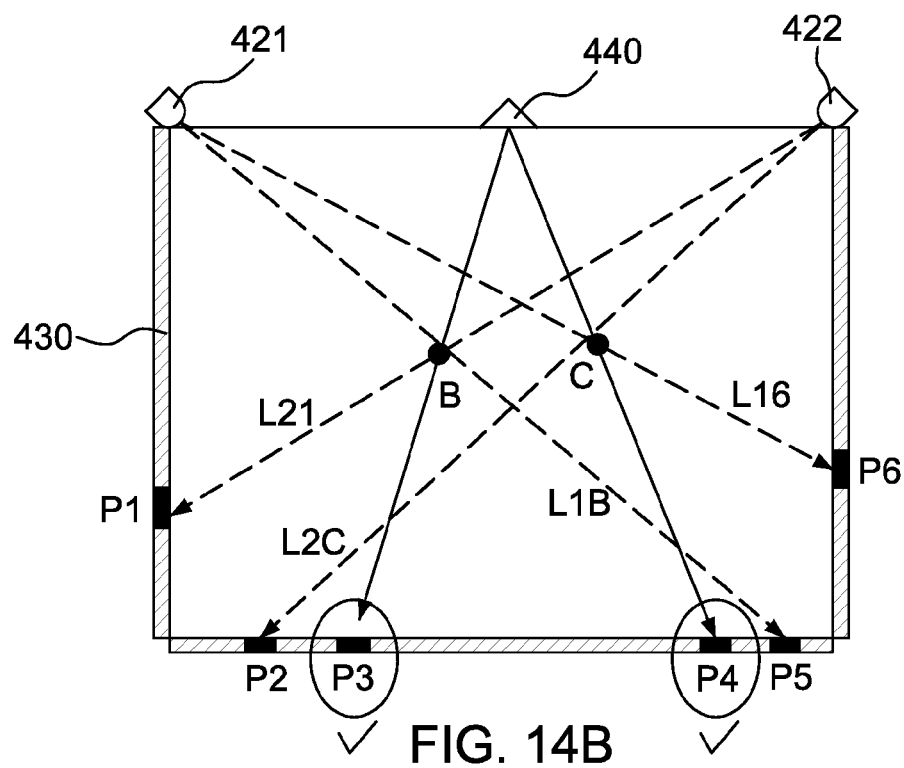

Next, the process of step 760 enters step 1320, where two respective lines are obtained for each of the possible combinations "A+C," "A+D," "B+C," and "B+D," by linking the first and second light sources respectively across the two points in each of the possible combinations. FIGS. 14A and 14B are exemplary diagrams explaining how step 1320 can be performed in accordance with a specific embodiment. Referring to FIG. 14A, which illustrates the locating procedure for the possible combination "A+C", a line L1A is extended from the first light source 421 and across second cross point "A," and a line L2C is extended from the second light source 422 and across the second cross point "C." Referring to FIG. 14B, which illustrates the locating procedure for the possible combination "B+C", a line L1B is extended from the first light source 421 and across second cross point "B," and a line L2C is extended from the second light source 422 and across the second cross point "C." For the other two possible combinations "A+D" and "B+D," similar locating processes can be performed, which are omitted here for brevity.

Next, the process of step 1030 proceeds to step 1330, where each of the possible combinations is verified by checking whether the two respective lines cross two shadows among the second group of shadows P2-P5. Referring to FIG. 14A, the lines L1A and L2C for the possible combination "A+C" cannot be extended to cross two shadows among the second group of shadows P2-P5. Contrarily, the lines L1B and L2C for the possible combination "B+C" can be extended to cross two shadows P3 and P4 among the second group of shadows P2-P5. For the other two possible combinations "A+D" and "B+D," similar verification processes can be performed, which are omitted here for brevity.

Next, the process of step 1030 enters step 1340, where the first and second lines of the third group of lines can be determined to be the two lines for the possible combination that can cross two shadows among the second group of shadows P2-P5. As a result, the first line can be determined to be the lines L1B and L2C, and accordingly, the process of locating the third group of lines in step 750 of FIG. 7 can be completed.

Referring back to FIG. 7, after step 750 to locate the third group of lines, the process enters step 760, where the coordinates of the two objects can be located by the third group of lines.

Finally, the process of FIG. 7 proceeds to step 760, in which the coordinates of the two objects are determined by the third group of lines. Referring to FIG. 12B, where the third group of lines are obtained to include lines L22, LD4, and L15 after the first cross point "E" is determined to be the location of one of the two objects, the location of the other of the two objects can be determined to be a cross point "C" of at least two lines of the third group of lines L22, LD4, and L15. On the other hand, referring to FIG. 14B, where the third group of lines are obtained to include the first and second lines L2C and L1B after the first cross point "E" is not determined to be the location of one of the two objects, the coordinates of the at least two objects can be determined to be the possible combination of two points "B," and "C" that are located on the first and second lines L2C and L1B, respectively.

It can be readily appreciated that the first, second, and third groups of lines are not limited to be obtained in the sequence as exemplarily shown in FIG. 7. For example, in alternative embodiments, steps 720 and 730 in FIG. 7 can be exchanged so that the first and second groups of lines are obtained in an inverted sequence.

Additionally, in the above embodiments, the possible coordinates are located by locating lines crossing the detector 440, and the possible coordinates are then verified by locating lines crossing the first and second light sources 421 and 422. However, in other embodiments, a plurality of possible coordinates may be located by obtaining lines crossing the first and second light sources 421 and 422, and the possible coordinates can then be verified by locating lines crossing the detector 440.

Additionally, the process illustrated in FIG. 7 is not limited to 6-shadow configuration, and can also be applied to shadow configurations with 5 or 3 shadows. Since the numbers of shadows in the second group of shadows varies in accordance with shadow configuration, the processes performed for various shadow configurations differ mainly in the number of lines in the second group. Other details can be readily understood by analogy, and so are omitted here for brevity.

Figure 15:
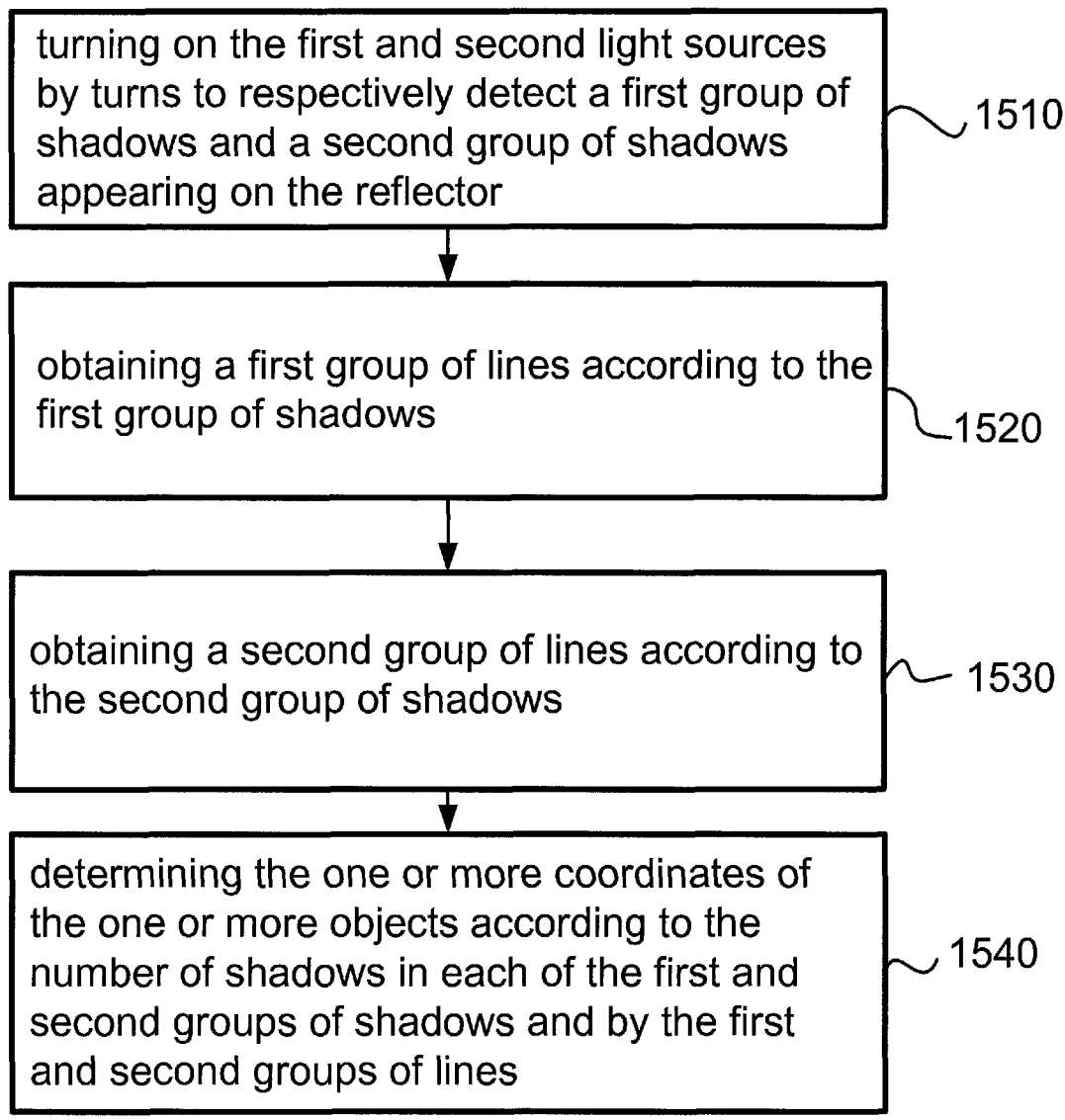
FIG. 15 is a flowchart showing the steps to locate the coordinates of at least two objects intruding the coordinate locating device of FIG. 4A in accordance with another embodiment.

FIG. 15 is a flowchart showing the steps to locate the coordinates of at least two objects intruding the coordinate locating device 400 of FIG. 4A in accordance with another embodiment.

First, step 1510 can be performed to turn on the first and second light sources 421 and 422 by turns, and to detect a first group of shadows cast by one or more objects (e.g. two objects) intruding the coordinate locating device 400 and appearing on the reflector 440 after the first light source is turned on, and to detect a second group of shadows cast by the one or more objects (e.g. two objects) intruding the coordinate locating device 400 and appearing on the reflector 440 after the second light source is turned on. For example, the first light source 421 can be first turned on while the second light source 422 can be turned off, and then the detector 440 can detect the first group of shadows. Next, the second light source 422 can be turned on while the first light source 421 can be turned off, and then the detector 440 can detect the second group of shadows, and so on.

In step 1510, five different types (referred hereafter to as "type 1" to "type 5") of shadow configurations can be detected, which have various numbers of shadows in the first and second group of shadows, and different numbers of common shadows of the first and second groups. A table is provided below summarizing different types of shadow configurations. In the table, the numbers of shadows in the first and second groups are denoted as "N1" and "N2," respectively. "Type 1" is caused by a single object, and each of "types 2" to "type 5" is caused by two objects. "Type 2" and "type 3" differ only in the number of common shadows.

| Type | Shadow Number | | |
|---|---|---|---|
| | N1 | N2 | Common Shadows |
| Type 1 | 2 | 2 | 1 |
| Type 2 | 4 | 4 | 2 |
| Type 3 | 4 | 4 | 3 |
| Type 4 | 3 | 3 | 1 |
| Type 5 | 3 | 4 | 2 |
| | 4 | 3 | |

Next, the process enters steps 1520 and 1530, which can be performed simultaneously or sequentially, respectively to locate a first group of lines according to the first group of shadows, and a second group of lines according to the second group of shadows. Preferably, the first and second groups of lines can include lines preliminarily estimated to cross the coordinates of the two objects. For example, the first group of lines can include a line located between the first light source and a shadow among the first group of shadows that is most adjacent to the second light source, and the second group of lines can include a second line located between the second light source and a second shadow among the second group of shadows that is most adjacent to the first light source. The details of the first and second groups of lines are illustrated in the following embodiments for specific types of shadow configurations.

Next, the process proceeds to step 1540 to determine the one or more coordinates according to the type of the shadow configuration and by the first and second group of lines. In other words, the determination can be realized according to the number of shadows in each the first and second groups. Additionally, since "type 2" and "type 3" differ only in the number of common shadows, the determination can be realized further according to the number of common shadows of the first and second groups of shadows if the number of shadows in each of the first and second groups is four.

Figure 16:
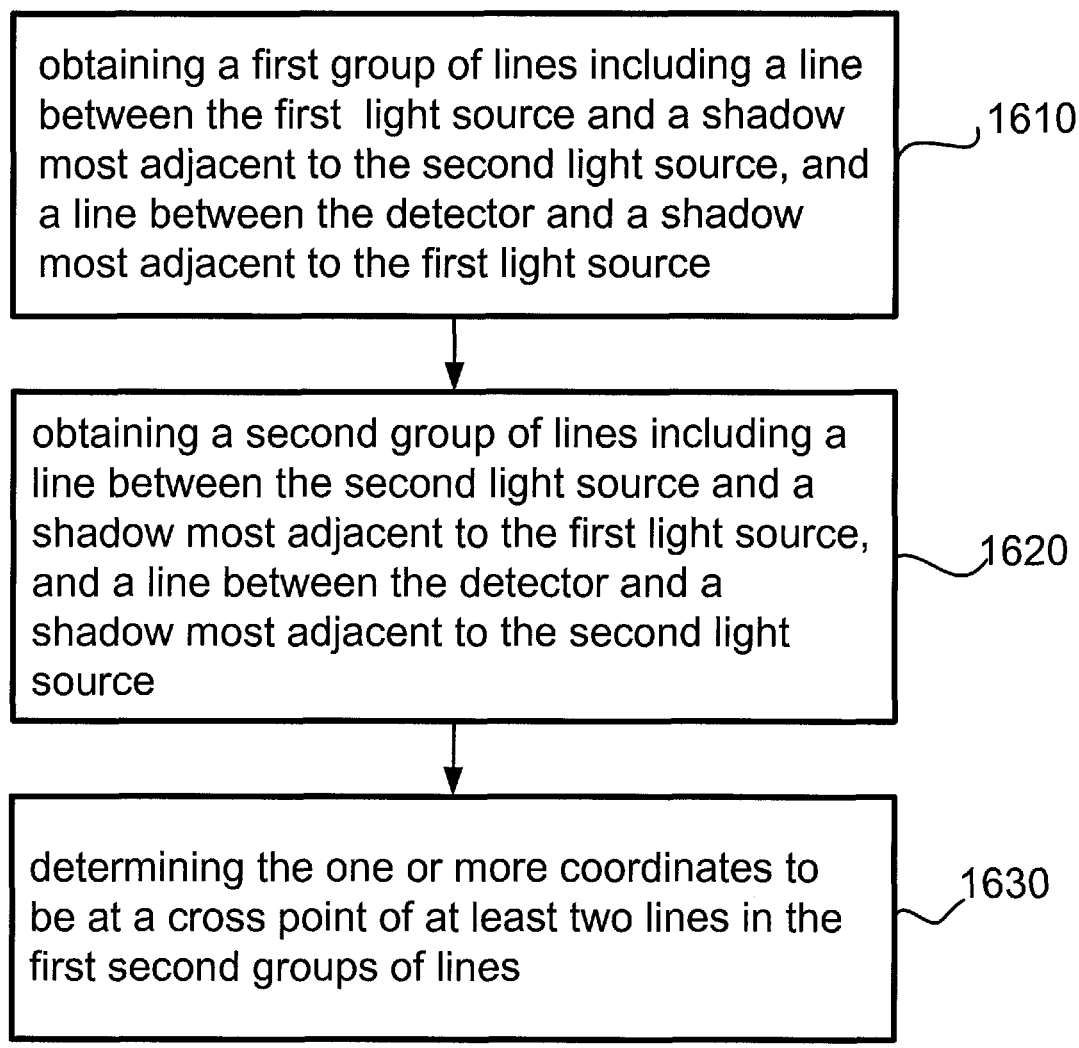
FIG. 16 is a flowchart showing details of steps of FIG. 15 in accordance with a specific embodiment for a first type of shadow configuration.
Figure 17A:
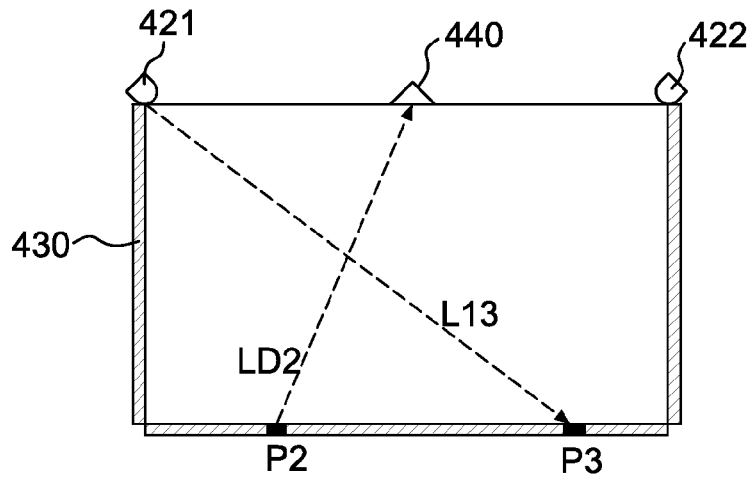
FIGS. 17A-17C are exemplary diagrams for explaining how the steps of FIG. 16 can be performed in accordance with a specific embodiment.
Figure 17B:
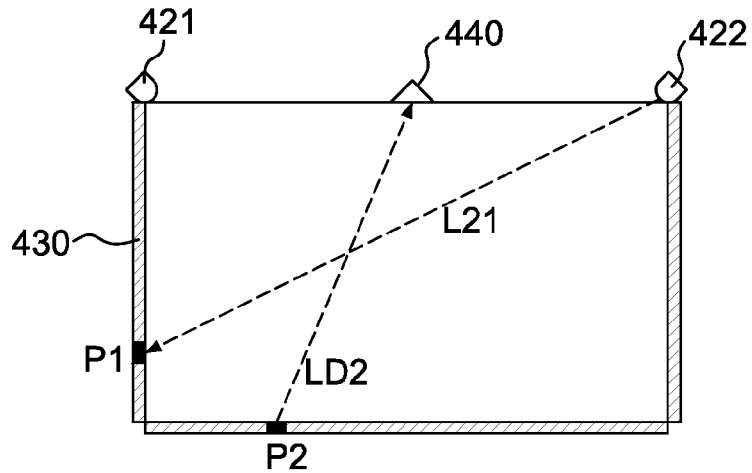
Figure 17C:
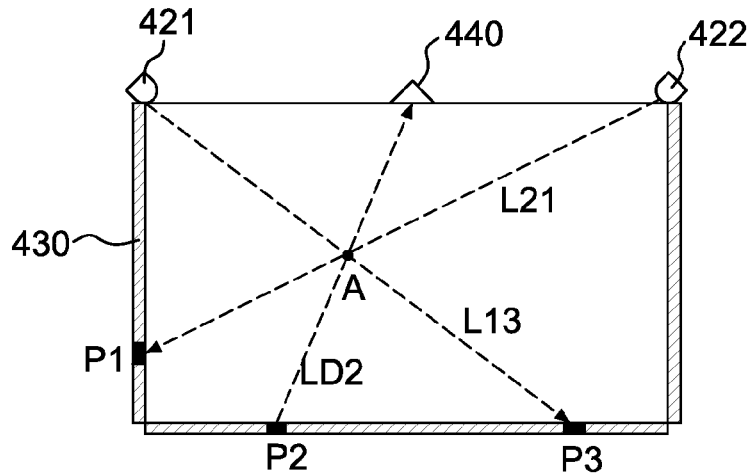

FIG. 16 is a flowchart showing details of steps 1520, 1530, and 1540 of FIG. 15 in accordance with a specific embodiment for a shadow configuration of type 1 where the number of each of the first and second groups of shadows is two. FIGS. 17A-17C are exemplary diagrams explaining how the steps of FIG. 16 can be performed in accordance with a specific embodiment.

The process of FIG. 16 can be started at steps 1610 and 1620, which are specific examples of step 1520 and 1530 of FIG. 15 and also can be performed sequentially or simultaneously. First, referring to step 1610 and FIG. 17A, a first group of lines can be obtained based on a first group of shadows P2 and P3, including a line L13 between the first light source 421 and a shadow P3 that is most adjacent to the second light source 422 in the first group of shadows P2 and P3. Additionally, the first group of lines can also include a line LD2 between the detector 440 and a shadow P2, which is most adjacent to the first light source 421 in the first group of shadows P2 and P3.

Turning to step 1620 of FIG. 16 and FIG. 17B, a second group of lines can be obtained based on a second group of shadows P1 and P2, including a line L21 between the second light source 422 and a shadow P1 which is most adjacent to the first light source 421 in the second group of shadows P1 and P2. Additionally, the second group of lines can also include a line LD2 between the detector 440 and a shadow P2 which is most adjacent to the second light source 422 in the second group of shadows P1 and P2.

The process then proceeds to step 1630 (a specific example of step 1540 of FIG. 15). Referring to step 1620 of FIG. 16 and FIG. 17C, the coordinates of an object can be determined to be at a cross point "A" of at least two lines in the first and second groups of lines.

Figure 18:
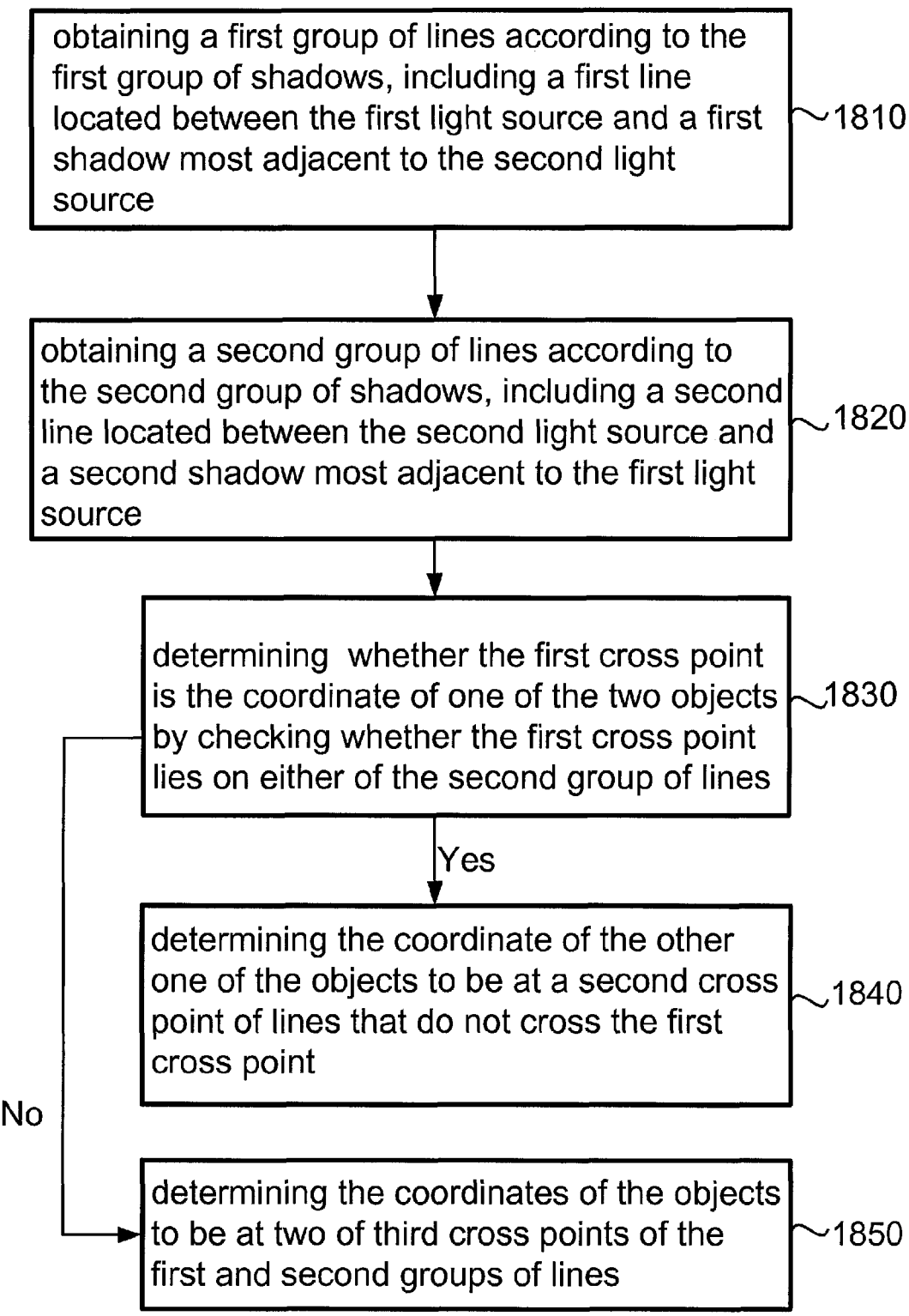
FIG. 18 is a flowchart showing details of steps of FIG. 15 in accordance with a specific embodiment for a second type of shadow configuration.

FIG. 18 is a flowchart showing details of steps 1520, 1530, and 1540 of FIG. 15 in accordance with a specific embodiment for a shadow configuration of type 2, where the number of shadows in each of the first and second groups of shadows is four and the number of common shadows of the first and second groups is two. FIGS. 19A-19F are exemplary diagrams for explaining how the steps of FIG. 18 can be performed in accordance with a specific embodiment.

The process of FIG. 18 can be started at steps 1810 and 1820, which are specific examples of steps 1520 and 1530 of FIG. 15 and also can be performed sequentially or simultaneously. The steps 1810 and 1820 are similar to steps 1610 and 1620 in FIG. 16.

Figure 19A:
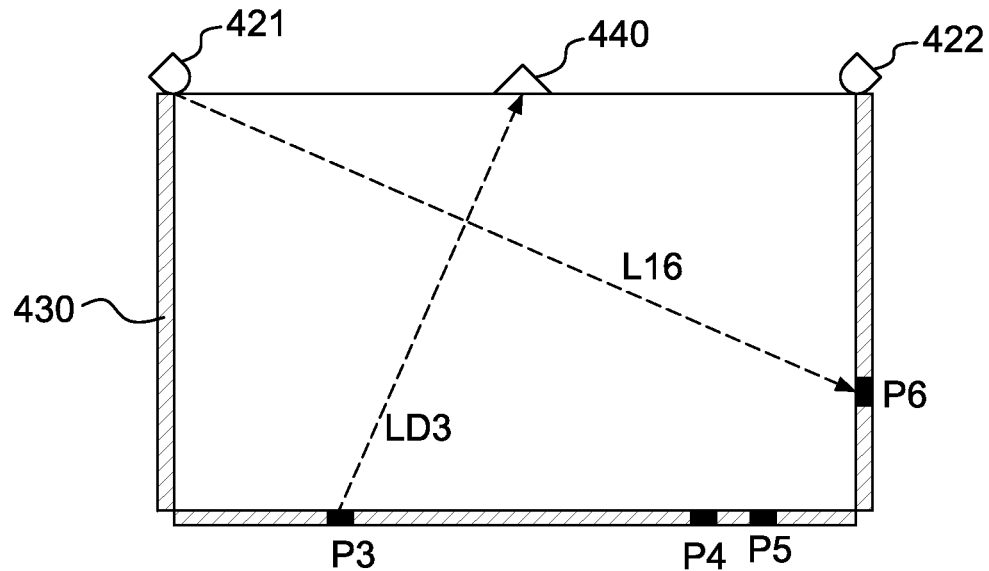
FIGS. 19A-19F are exemplary diagrams for explaining how the steps of FIG. 18 can be performed in accordance with a specific embodiment.

Referring to step 1810 of FIG. 18 and FIG. 19A, a first group of lines can be obtained based on a first group of shadows P3-P6, including: a first line L16 between the first light source 421 and a first shadow P6 that is most adjacent to the second light source 422 in the first group of shadows P3-P6; and a third line LD3 between the detector 440 and a shadow P3, which is most adjacent to the first light source 421 in the first group of shadows P3-P6.

Figure 19B:
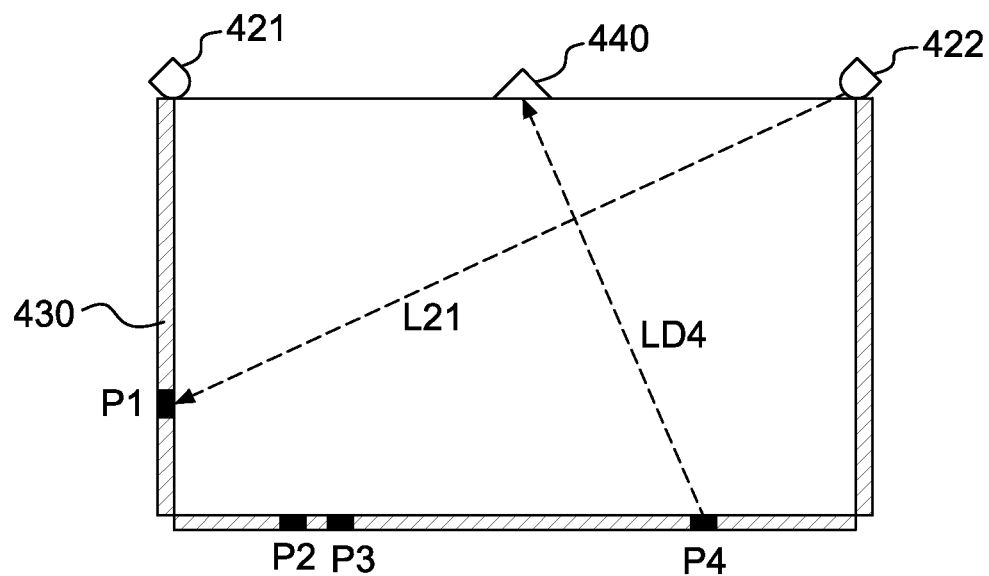

Turning to step 1820 of FIG. 18 and FIG. 19B, a second group of lines can be obtained based on a second group of shadows P1-P4, including: a second line L21 between the second light source 422 and a second shadow P1 that is most adjacent to the first light source 421 in the second group of shadows P1-P4; and a fourth line LD4 between the detector 440 and a shadow P4, which is most adjacent to the second light source 422 in the second group of shadows P1-P4.

Next, steps 1830, 1840, and 1850 are sequentially performed, which collectively serve as a specific example of step 1540 of FIG. 15. First, referring to step 1830 and FIGS. 19C and 19D, it is determined whether a first cross point "E" of the first line L16 of the first group of lines and the second line L21 of the second group of lines is the location of one of the objects, for example, by checking whether the first cross point "E" lies on either of the third line (LD3 in FIG. 19C and LD2 in FIG. 19D) of the first group of lines or the fourth line (LD4 in both FIGS. 19C and 19D) of the second group of lines.

Figure 19C:
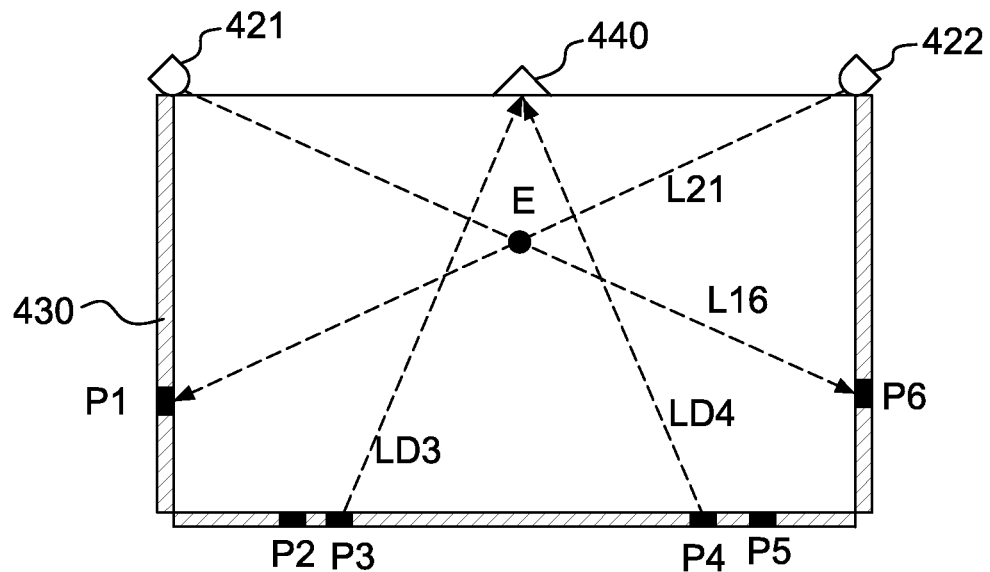
Figure 19D:
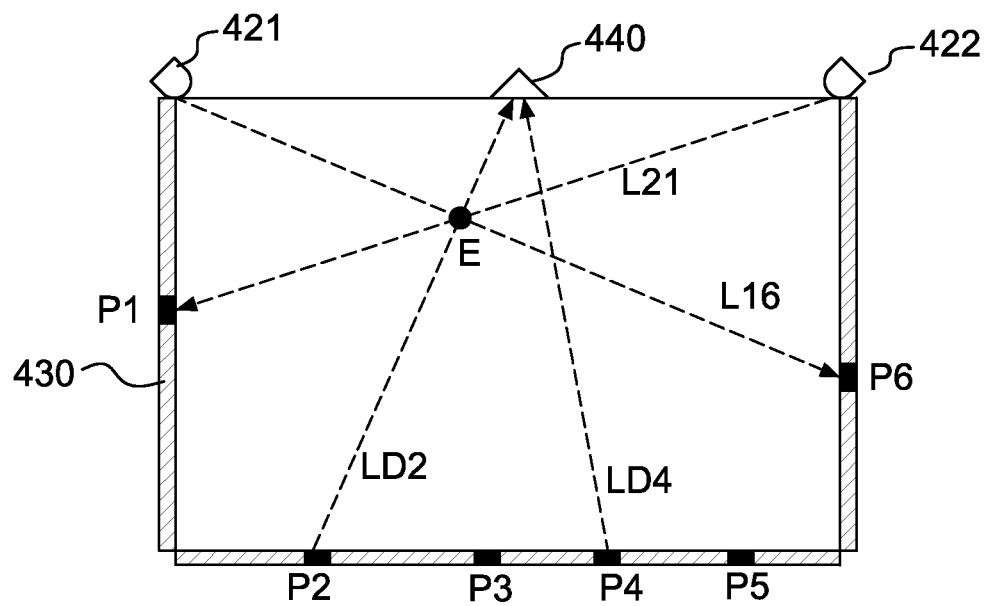
Figure 19E:
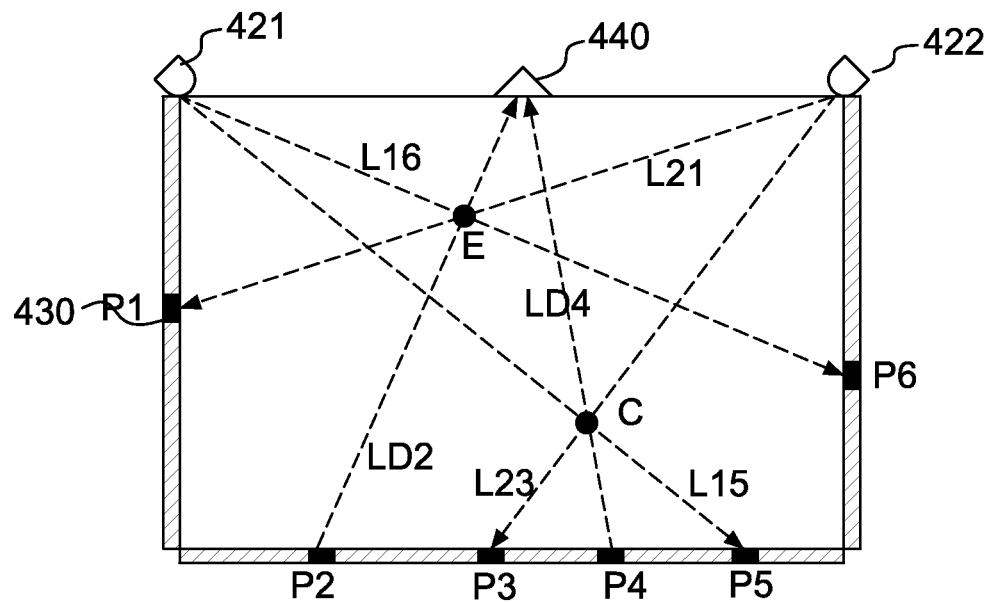

Next, referring to step 1840 of FIG. 18 and FIG. 19E, if the determination of step 1830 is affirmative ("Yes") as shown in FIG. 19C, meaning that the first cross point "E" is the location of one of the objects, then the coordinates of the other of the objects can be determined to be at a second cross point "C" of at least two lines (such as lines L23, L15, and LD4 in FIG. 19E) that do not cross the first cross point "E." In accordance with an example, the at least two lines can be obtained in a step similar to step 1020 of FIG. 10 to locate the third group of lines that are exemplarily illustrated as lines L15, L22, and LD4 in FIG. 12B, and so the details are omitted here for brevity.

Figure 19F:
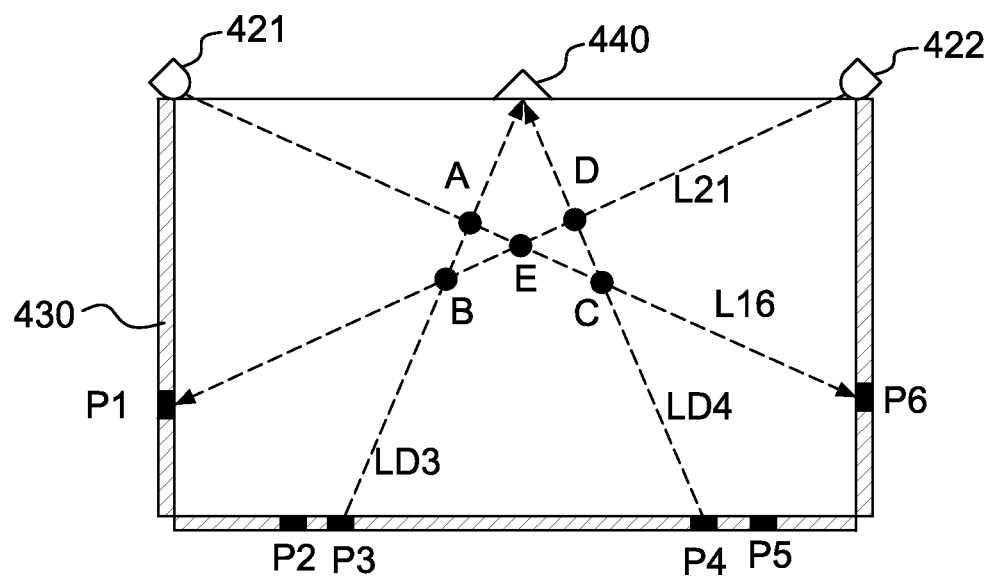

Next, referring to step 1850 of FIG. 18 and FIG. 19F, if the determination of step 1830 is negative ("No"), as shown in FIG. 19D, meaning that the first cross point "E" is not the coordinates of one of the objects, then the coordinates of the objects can be determined to be at two cross points "B" and "C" of third cross points "A"-"D" of the first and second groups of lines L16, L21, LD3, and LD4, wherein the cross points "B" and "C" are located between the first cross point "E" and the second shadow P1, and between the first cross point "E" and the first shadow P6, respectively.

Compared to the embodiment of FIGS. 5 and 7 where the first and second light sources 421 and 422 are turned on simultaneously, and the lines which can be preliminarily estimated to cross the coordinates of the one or more objects only include the first group of lines L16 and L21, more lines (i.e., the first and second groups of lines L16, L21, LD3, and LD4) crossing the coordinates the objects can be preliminarily located in the embodiment of FIG. 12. Accordingly, steps 730 and 740 of FIG. 7 to locate a group of possible coordinates, and steps 1310-1340 of FIG. 13 to verify the group of possible coordinates by locating a possible combination of two coordinates, can be skipped.

It is noted from FIGS. 19A and 19B, since there are common shadows P3 and P4 in the first group of shadows P3-P6 and the second groups of shadows P1-P4, the lines L16, L21, LD3, and LD4 of the first and second groups can be obtained in a sequence different from that of steps 1810 and 1820 in FIG. 18 by additionally recognizing the common shadows P3 and P4.

Figure 20A:
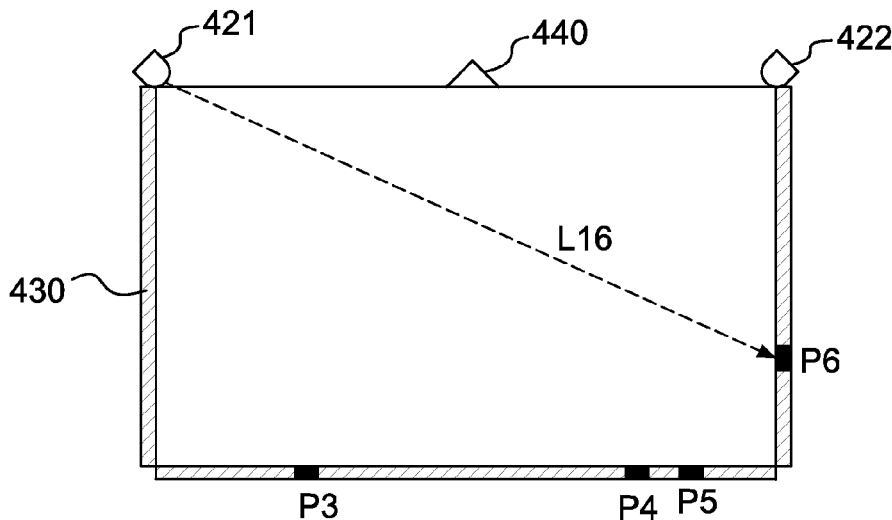
FIGS. 20A-20C are exemplary diagrams for explaining locating the first and second groups of lines in accordance with an alternative embodiment.
Figure 20B:
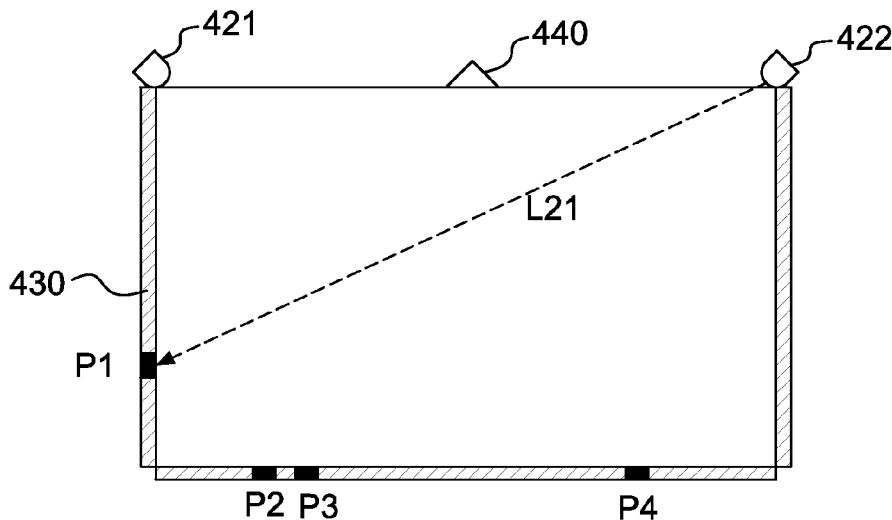
Figure 20C:
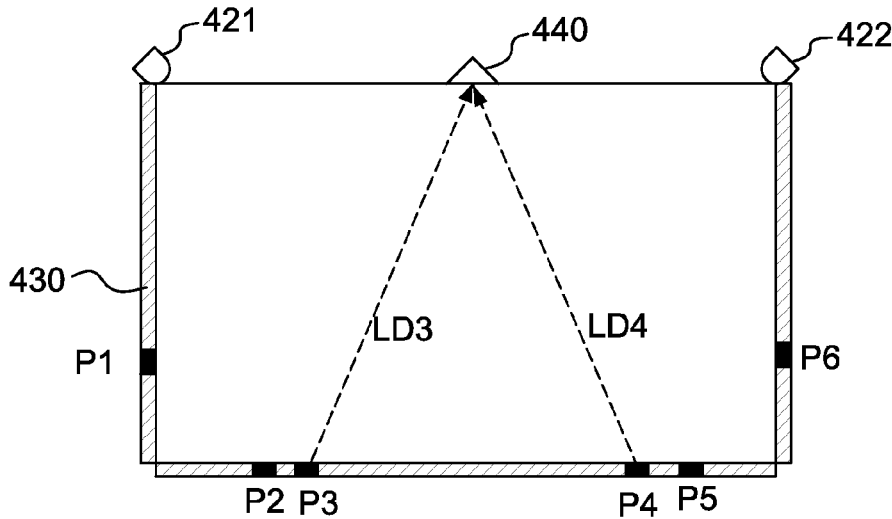

FIGS. 20A-20C are exemplary diagrams for explaining how this can be performed in accordance with a specific embodiment. Referring first to FIG. 20A, a first group of lines can be obtained based on the first group of shadows P3-P6, including only the first line L16. Referring to FIG. 20B, a second group of lines can be obtained based on the second group of shadows P1-P4, including only the second line L21. Next, referring to FIG. 20C, a step can be further performed to locate the third and fourth lines LD3 and LD4 by additionally recognizing the common shadows P3 and P4 of the first and second group of shadows P3-P6 and P1-P4. The subsequent steps are similar to those described for the embodiment of FIG. 18, and so are omitted here fore brevity.

Figure 21:
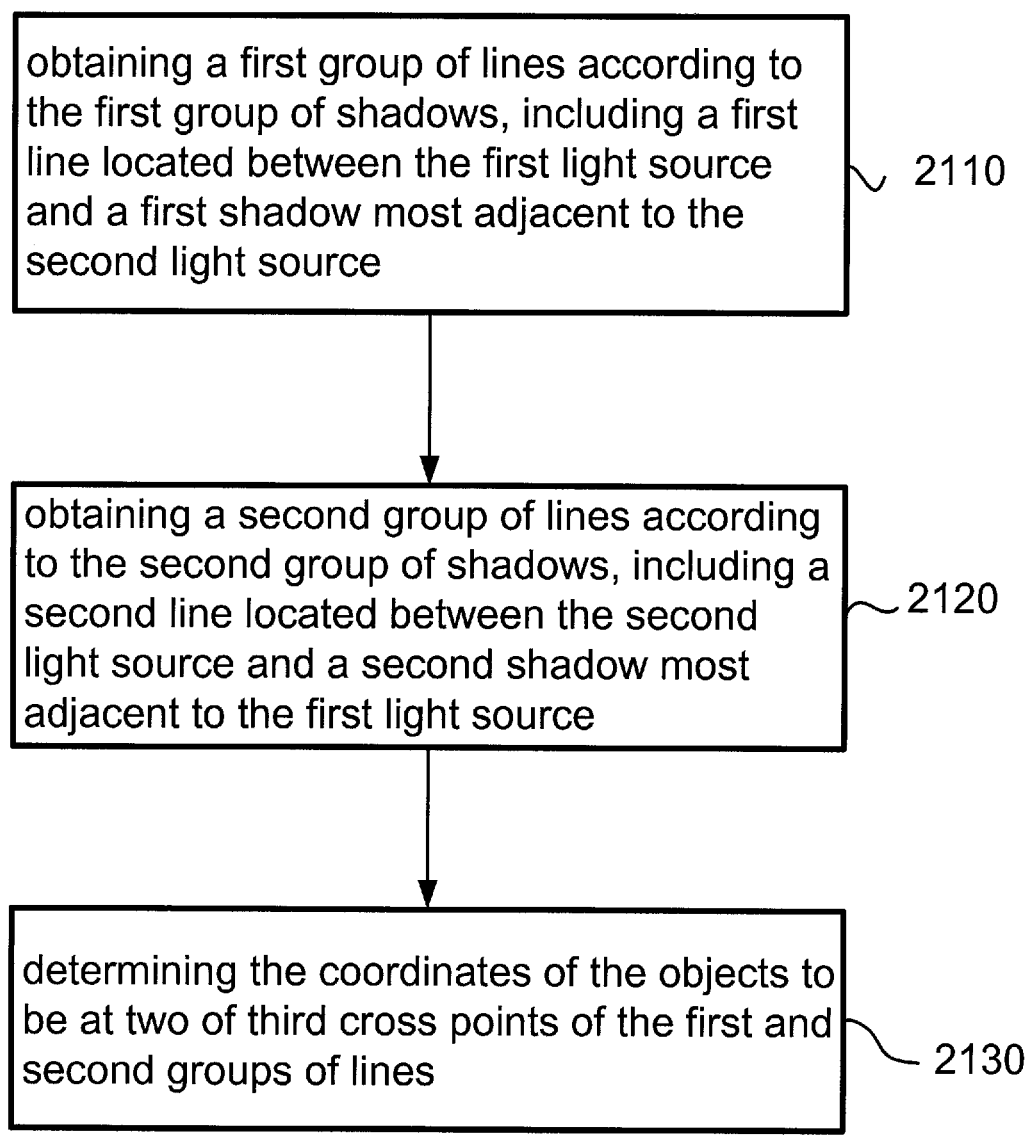
FIG. 21 is a flowchart showing details of steps of FIG. 15 in accordance with a specific embodiment for a third type of shadow configuration.
Figure 22A:
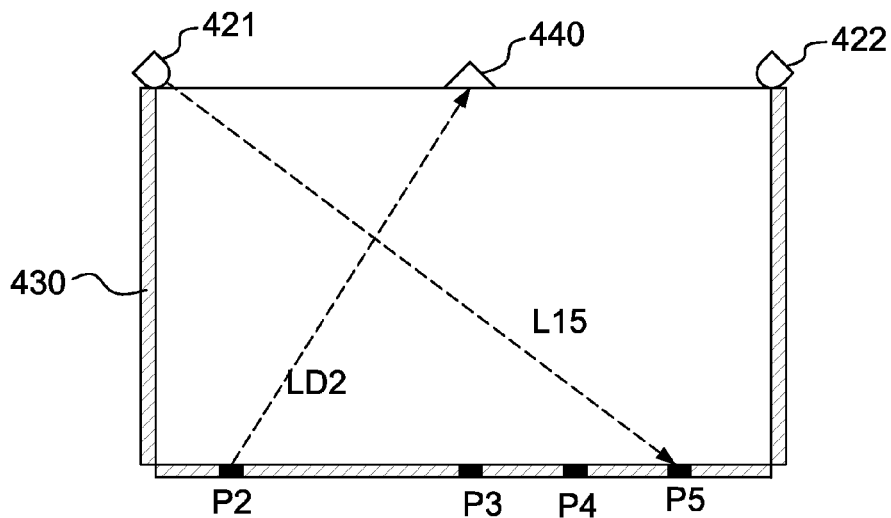
FIGS. 22A-22C are exemplary diagrams for explaining how the steps of FIG. 21 can be performed in accordance with a specific embodiment.
Figure 22B:
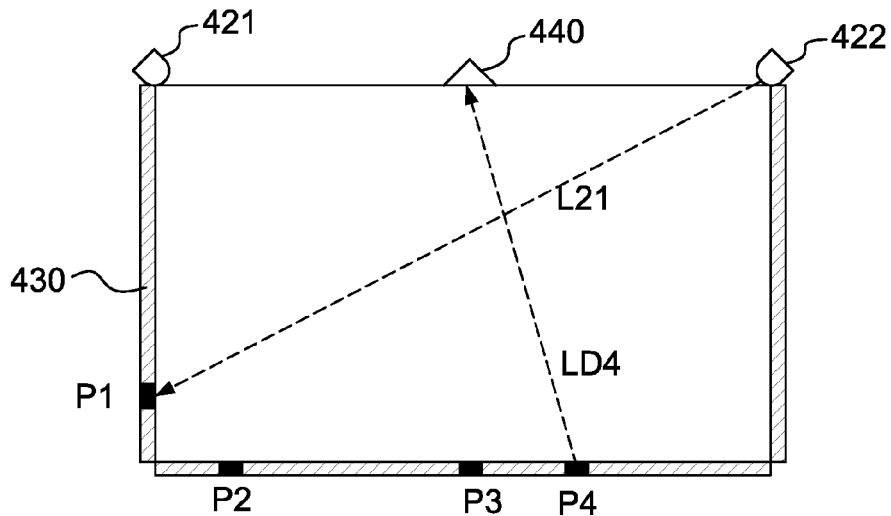
Figure 22C:
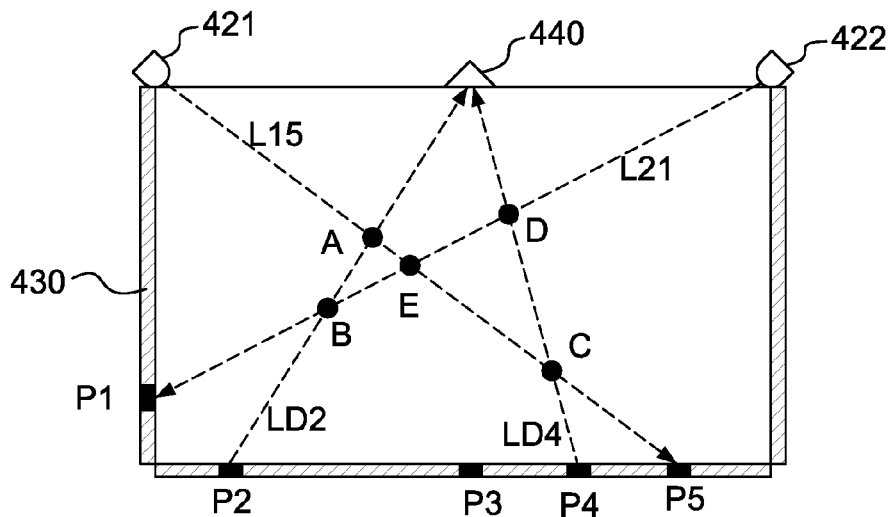

FIG. 21 is a flowchart showing details of steps 1520, 1530, and 1540 of FIG. 15 in accordance with a specific embodiment for a shadow configuration of "type 3," where the number of shadows in each of the first and second groups of shadows is four and the number of common shadows of the first and second groups is three. FIGS. 22A-22C are exemplary diagrams for explaining how the steps of FIG. 21 can be performed in accordance with a specific embodiment.

The process of FIG. 21 can be started at steps 2110 and 2120, which are specific examples of steps 1520 and 1530 of FIG. 15 and also can be performed sequentially or simultaneously. The steps 2110 and 2120 are similar to steps 1610 and 1620 in FIG. 16.

Referring to step 2110 of FIG. 21 and FIG. 22A, a first group of lines can be obtained based a first group of shadows P2-P5, including: a first line L15 between the first light source 421 and a first shadow P5 which is most adjacent to the second light source 422 in the first group of shadows P2-P5; and a third line LD2 between the detector 440 and a shadow P2 which is most adjacent to the first light source 421 in the first group of shadows P2-P5.

Turning to step 2120 of FIG. 21 and FIG. 22B, a second group of lines can be obtained based on a second group of shadows P1-P4, including: a second line L21 crossing the second light source 422 and a second shadow P1 which is most adjacent to the first light source 421 in the second group of shadows P1-P4; and a fourth line LD4 crossing the detector 440 and a shadow P4 which is most adjacent to the second light source 422 in the second group of shadows P1-P4.

Figure 23A:
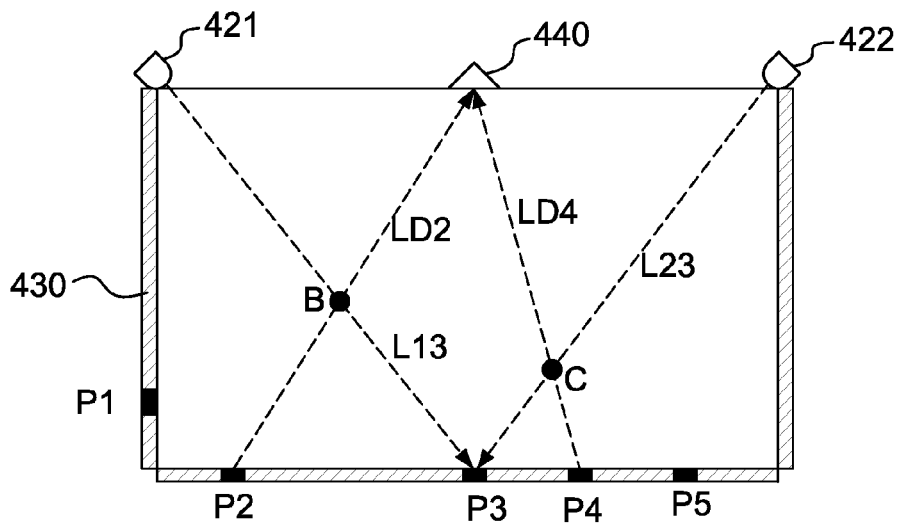
FIGS. 23A-23C are exemplary diagrams for explaining locating the first and second groups of lines in accordance with other three different specific embodiment.
Figure 23B:
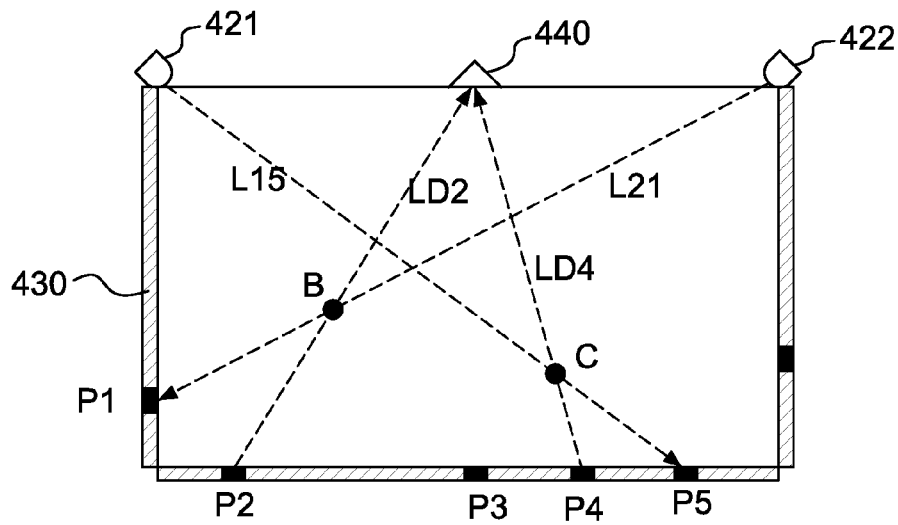
Figure 23C:
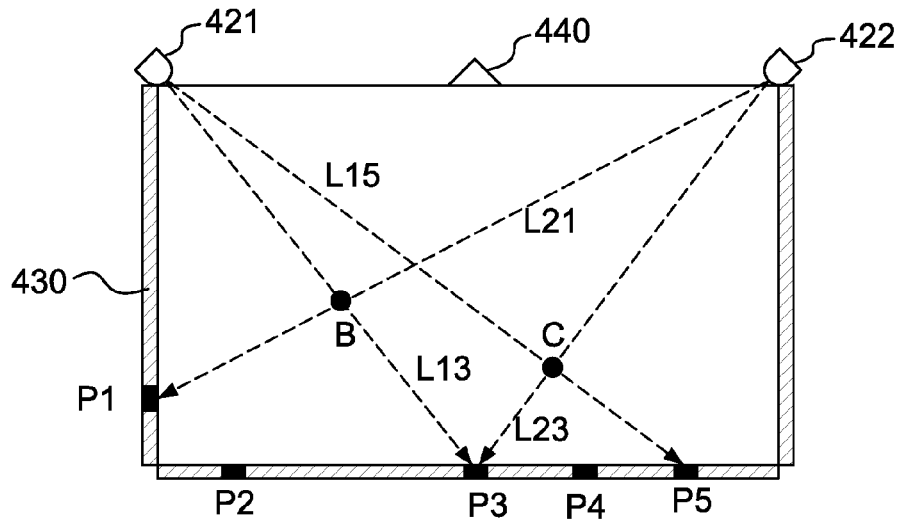

Next, step 2130 is performed as illustrated in FIG. 22C, which is a specific example of step 1540 of FIG. 15. In step 2130 and FIG. 22C, which are similar to step 1850 of FIG. 18 and FIG. 19F, the coordinates of the objects can be determined to be at two cross points "B" and "C" of cross points "A"-"D" of the first and second groups of lines L15, L21, LD2, and LD4, wherein the cross points "B" and "C" are located between the first cross point "E" and the second shadow P1, and between the first cross point "E" and the first shadow P5, respectively It is noted from FIGS. 22A and 22B, since there are common shadows P2, P3 and P4 in the first group of shadows P3-P6 and the second groups of shadows P1-P4, different lines can be obtained other than the first group of lines L15 and LD2 and the second group of lines L21 and LD4, by additionally recognizing the common shadows P2-P4. FIGS. 23A-23C are exemplary diagrams for explaining how this can be performed in accordance with other three different specific embodiments.

Referring to FIG. 23A, after the first and second groups of shadows P3-P6 and P1-P4 are detected, common shadows P2-P4 among them can be recognized. Next, lines LD2 and LD4 can then be obtained between the detector 440 and the shadows P2 and P4 respectively which are most adjacent to the first and second light sources 421 and 422 in the common shadows P2-P4. Additionally, lines L13 and L23 can also be obtained between the middle shadow P3 among the common shadows P2-P4 and the first and second light sources 421 and 422, respectively. Accordingly, the coordinates of the objects can then be located at cross points of the lines LD2, LD4, L13, and L23.

Referring to FIG. 23B, after the first and second groups of shadows P3-P6 and P1-P4 are detected, lines L15 and L21 can be obtained respectively between the first light source 421 and a shadow P5 which is most adjacent to the second light source 422 in the first group of shadows, and between the second light source 422 and a shadow P1 that is most adjacent to the first light source 421. Additionally, common shadows P2-P4 of the first and second groups of shadows can be recognized, and lines LD2 and LD4 can then be obtained between the detector 440 and the shadows P2 and P4 respectively which are most adjacent to the first and second light sources 421 and 422 in the common shadows P2-P4. Accordingly, the coordinates of the objects can then be located at cross points of the lines L15, L21, LD2, and LD4.

Referring to FIG. 23C, similar to FIG. 23B, after the first and second groups of shadows P3-P6 and P1-P4 are detected, lines L15 and L21 can be obtained. Additionally, common shadows P2-P4 of the first and second groups of shadows can be recognized, and lines L13 and L23 can then be obtained between the middle shadow P3 among the common shadows P2-P4 and the first and second light sources 421 and 422, respectively. Accordingly, the coordinates of the objects can then be obtained at cross points of the lines L15, L21, L13, and L23.

Figure 24:
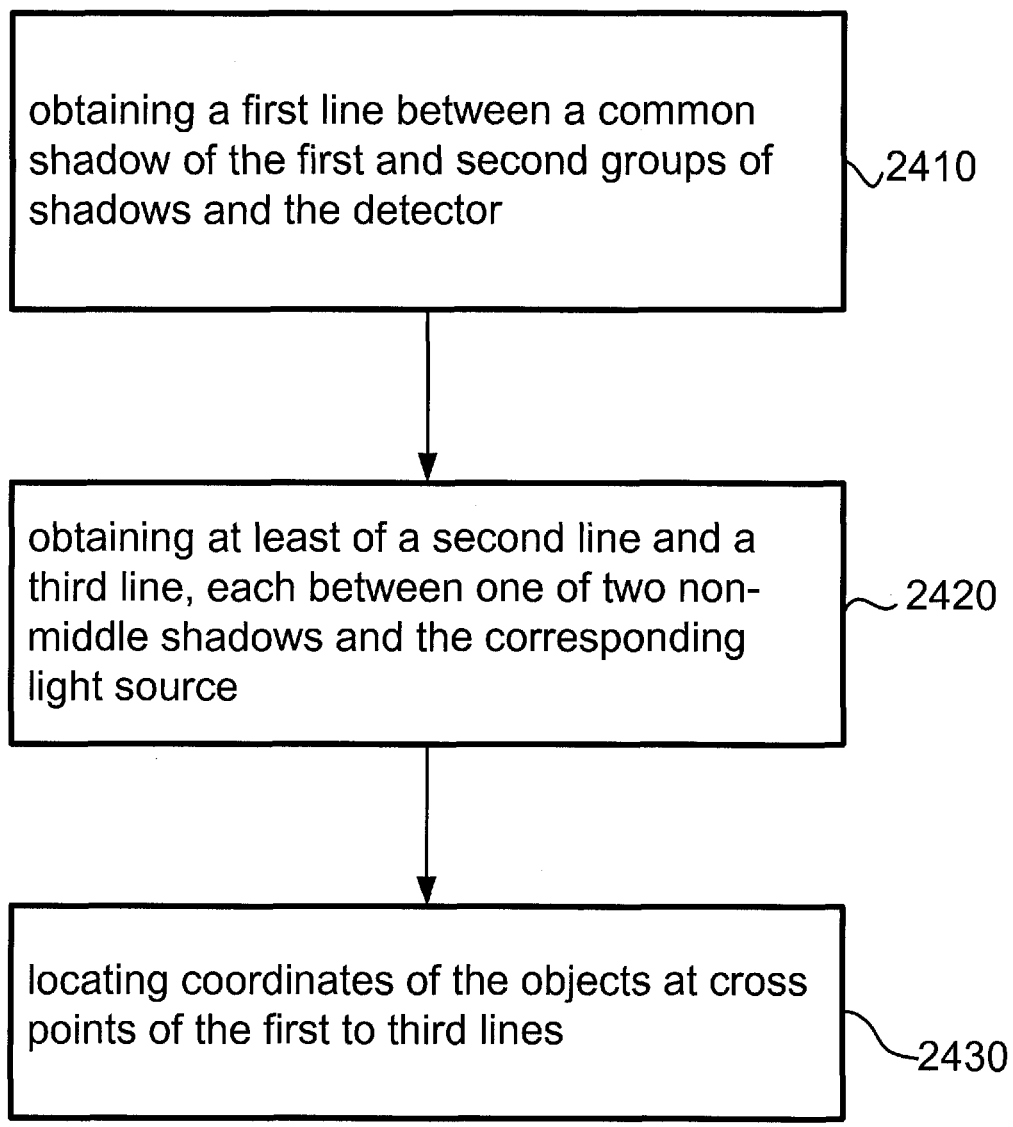
FIG. 24 is a flowchart showing details of steps of FIG. 15 in accordance with a specific embodiment for a fourth type of shadow configuration.
Figure 25A:
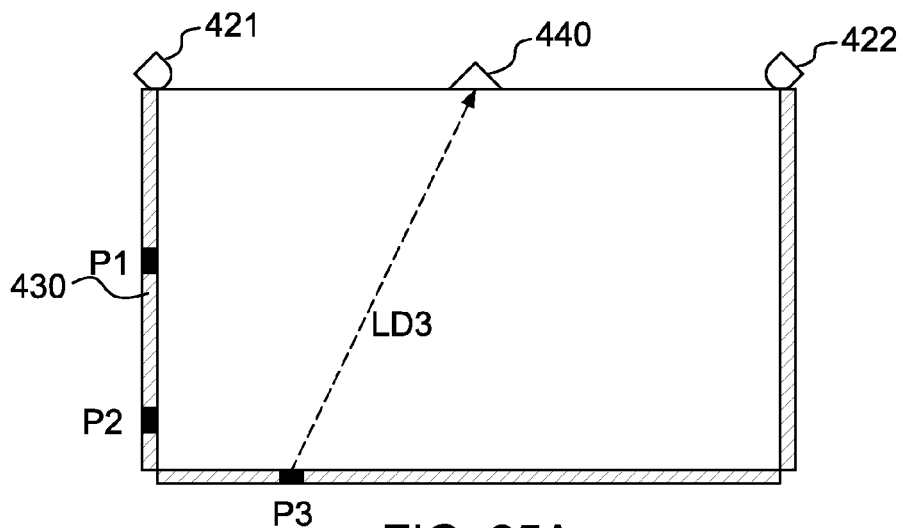
FIGS. 25A-25C are exemplary diagrams for explaining how the steps of FIG. 24 can be performed in accordance with a specific embodiment.
Figure 25B:
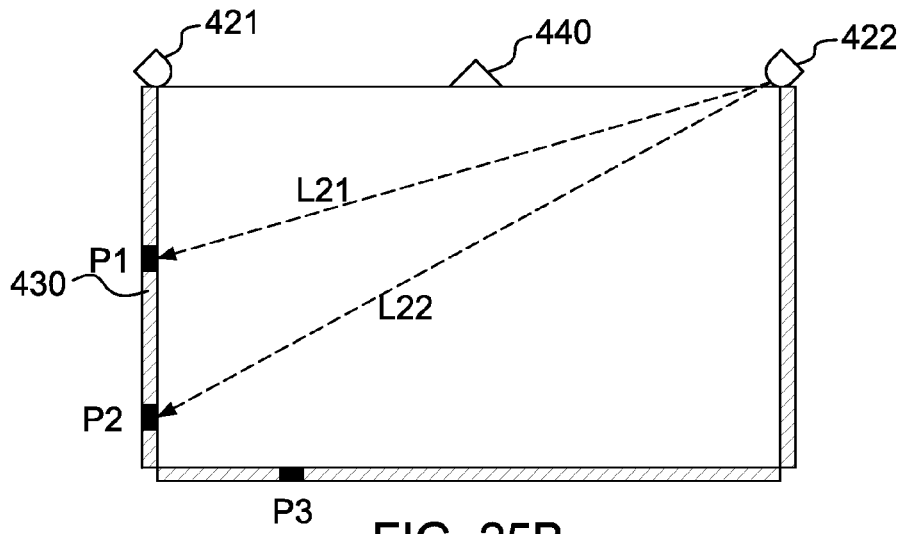
Figure 25C:
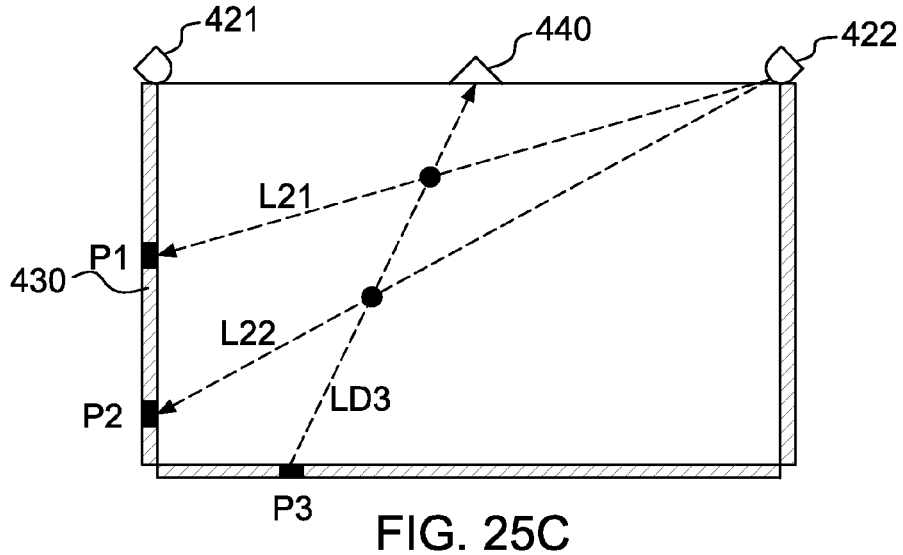

FIG. 24 is a flowchart showing details of steps 1520, 1530, and 1540 of FIG. 15 in accordance with a specific embodiment for a shadow configuration of type 4, where the number of shadows in each of the first and second groups of shadows is 3. FIGS. 25A-25C are exemplary diagrams for explaining how the steps of FIG. 24 can be performed in accordance with a specific embodiment.

The process can be started by steps 2410 and 2420, which can be performed simultaneously or sequentially. Referring to step 2410 of FIG. 24 and FIG. 25A, a first line LD3 can be obtained between the detector 440 and a common shadow 3 among a first group of shadows P3-P5 (not shown) and a second group of shadows P1-P3. Additionally, referring to step 2420 and FIG. 25B, a second line L21 and a third line L22 can be obtained between the second light source 422 and the shadows P1 and P2 other than the common shadow P3 among the second group of shadows P1-P3. Alternatively, the second and third lines can be obtained between the first light source 421 and the shadows P4 and P5 other than the common shadow P3 among the first group of shadows P3-P5. Finally, referring to step 2430 and FIG. 25C, the coordinates of the objects can be determined to be at cross points "B" and "C" of the first to third lines LD3, L21, and L22.

Figure 26:
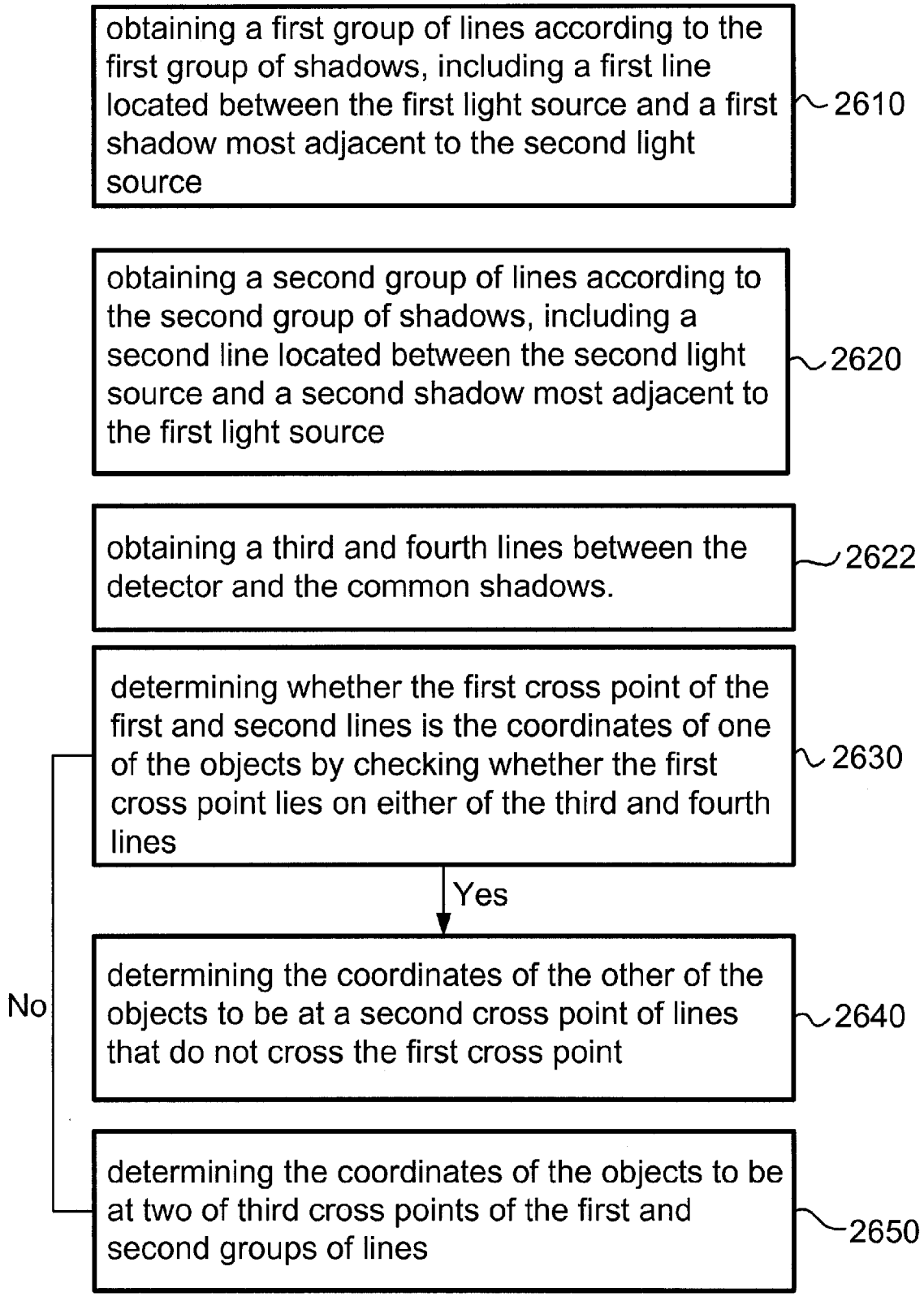
FIG. 26 is a flowchart showing details of steps 1520, 1530, and 1540 in FIG. 15 in accordance with a specific embodiment for a fifth shadow configuration.

FIG. 26 is a flowchart showing details of steps 1520, 1530, and 1540 of FIG. 15 in accordance with a specific embodiment for a shadow configuration of "type 5" where the number of shadows in the first and second groups of shadows are four and three, respectively. FIGS. 27A-27G are exemplary diagrams for explaining how the steps of FIG. 26 can be performed in accordance with a specific embodiment. The process illustrated in FIGS. 26 and 27A-27G can be readily analogized to a shadow configuration of type 5 with three and four shadows in the first and second groups, respectively. FIG. 26 is similar to FIG. 18 for a shadow configuration of type 2, differing mainly in steps 2610, 2620, and 2622 to preliminarily locate lines crossing the coordinates of the objects.

The process of FIG. 26 can be started at steps 2610 and 2620, which are specific examples of steps 1520 and 1530 of FIG. 15 and also can be performed sequentially or simultaneously. Steps 2610 and 2620 are similar to steps 1610 and 1620 in FIG. 16.

Figure 27A:
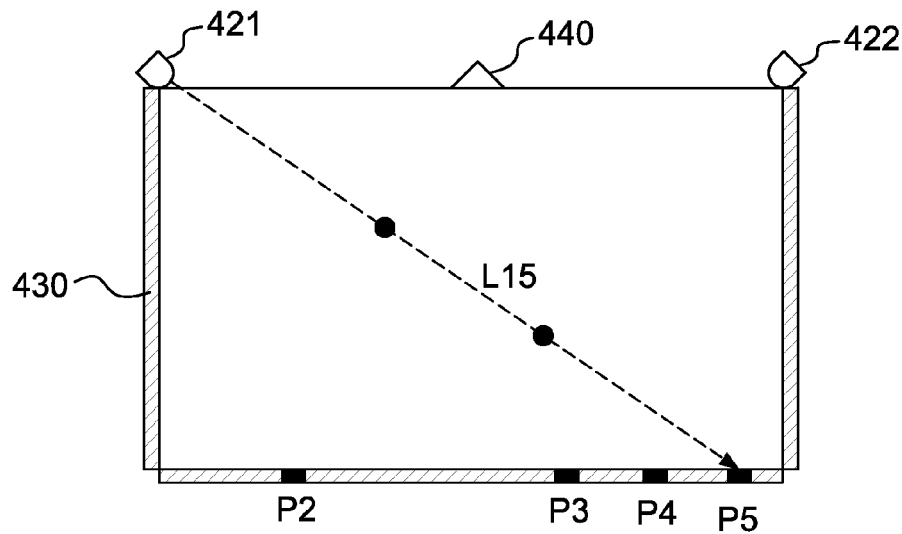
FIGS. 27A-27G are exemplary diagrams for explaining how the steps of FIG. 26 can be performed in accordance with a specific embodiment.

Referring to step 2610 of FIG. 26 and FIG. 27A, a first group of lines can be obtained based on a first group of shadows P2-P5, including: a first line L15 between the first light source 421 and a first shadow P5 that is most adjacent to the second light source 422 in the first group of shadows P3-P6.

Figure 27B:
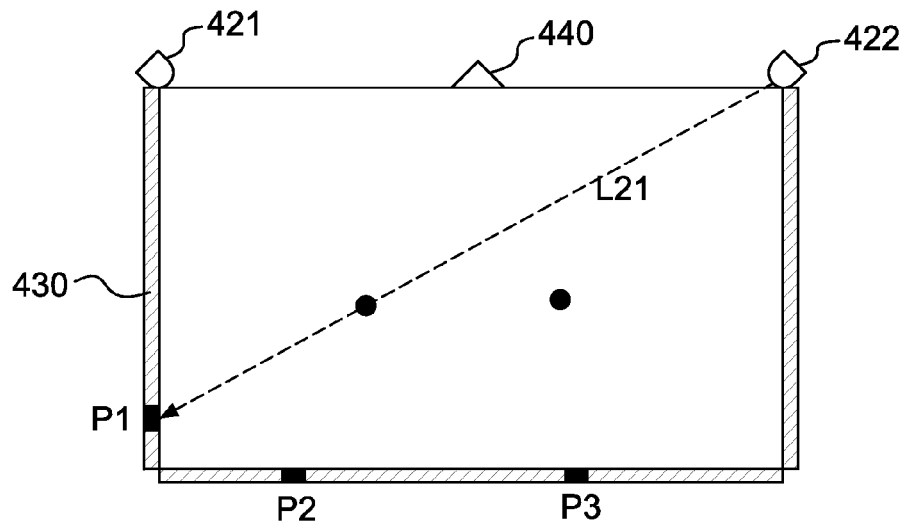

Turning to step 2620 of FIG. 26 and FIG. 27B, a second group of lines can be obtained based on a second group of shadows P1-P3, including a second line L21 between the second light source 422 and a second shadow P1 that is most adjacent to the first light source 421 in the second group of shadows P1-P4.

Figure 27C:
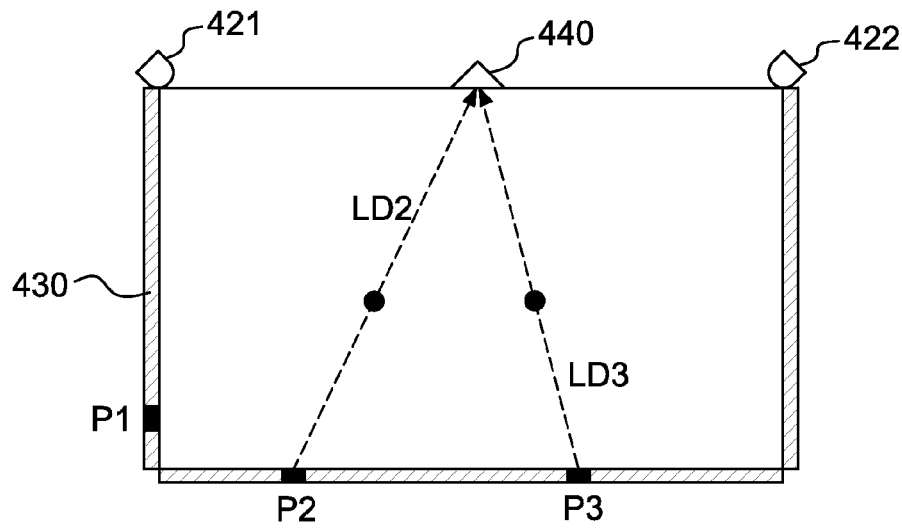

Turning to step 2622 of FIG. 26 and FIG. 27C, a third line LD2 and a fourth line LD3 can be obtained between the detector 440 and the common shadows P2 and P3 of the first and second group of shadows P2-P5 and P1-P3, respectively.

Next, steps 2630, 2640, and 2650 are sequentially performed, which collectively serve as a specific example of step 1540 of FIG. 15. First, referring to step 2630 and FIGS. 27D and 27E, it is determined whether a first cross point "E" of the first line L15 and the second line L21 is the coordinates of one of the objects, for example, by checking whether the first cross point "E" lies on either of the third line (LD2 in both FIGS. 27D and 27E) of the first group of lines or the fourth line (LD3 in both FIGS. 27D and 27E) of the second group of lines.

Figure 27D:
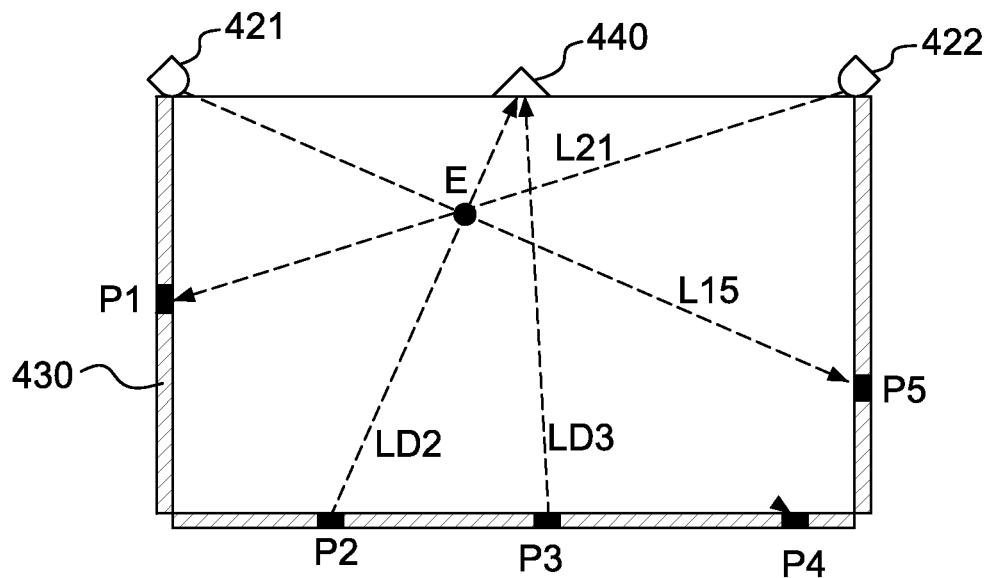
Figure 27E:
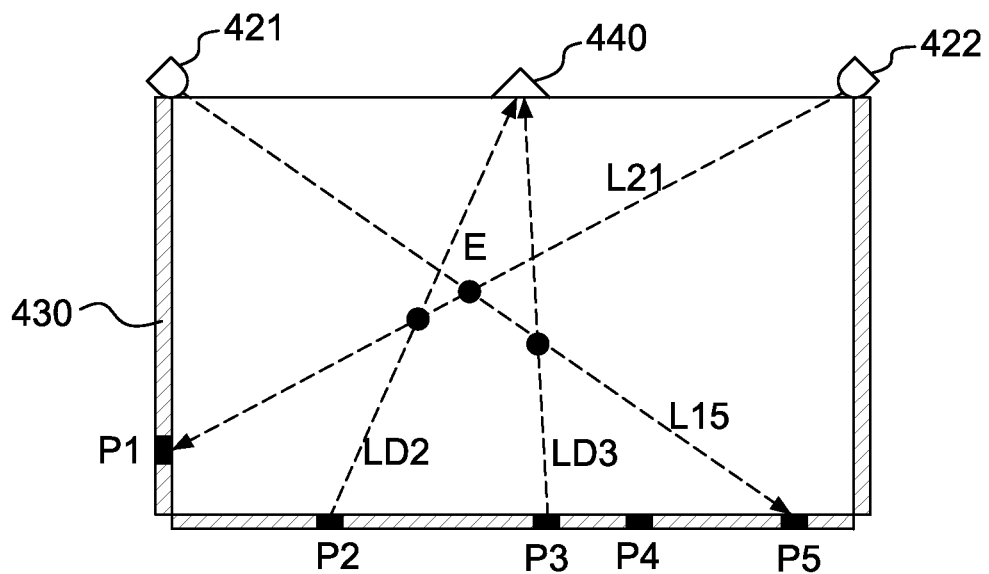
Figure 27F:
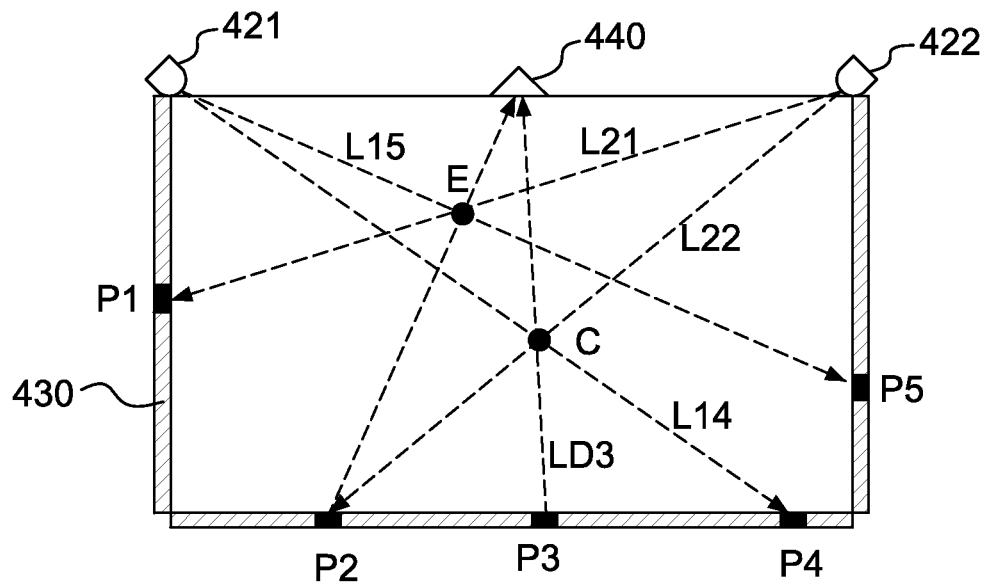

Next, referring to step 2640 of FIG. 26 and FIG. 27F, if the determination of step 1830 is affirmative ("Yes") as shown in FIG. 27D, meaning that the first cross point "E" is the coordinates of one of the objects, then the coordinates of the other of the objects can be determined to be at a second cross point "C" of at least two lines (such as lines L22, L14, and LD3 in FIG. 27F) that do not cross the first cross point "E." In accordance with an example, the at least two lines can be obtained in a step similar to the step 1020 of FIG. 10 to locate the third group of lines that are exemplarily illustrated as lines L15, L22, and LD4 in FIG. 12B, and so the details are omitted here for brevity.

Figure 27G:
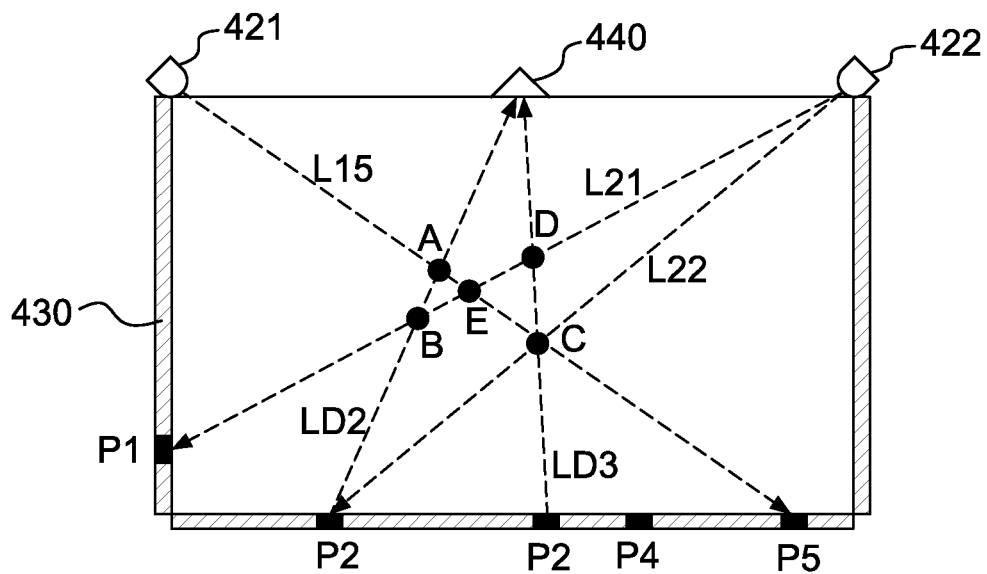

Next, referring to step 2650 of FIG. 26 and FIG. 27G, if the determination of step 2630 is negative ("No") as shown in FIG. 27E, meaning that the first cross point "E" is not the location of one of the objects, then the coordinates of the objects can be determined to be at two cross points "B" and "C" of third cross points "A"-"D" of the first and second groups of lines L15, L21, LD2, and LD3, wherein the cross points "B" and "C" are located between the first cross point "E" and the second shadow P1, and between the first cross point "E" and the first shadow P5, respectively.

In the following descriptions, a comparison detailed between the coordinate locating devices in the embodiments and conventional technology demonstrates the advantages provided by the coordinate locating devices in the embodiments.

In a conventional coordinate locating device, at least two light sources and two detectors are required. In contrast, the coordinate locating devices in the embodiments can be implemented with only one or two image sources and only one detector, thus requiring lower manufacturing costs.

Moreover, conventional coordinate locating devices can only determine the coordinate or gesture of a single object, because each light source and corresponding detector are disposed at the same position (such as the same corner of a display panel), so they can cast only one shadow of an object. In contrast, each light source and the detector in the coordinate locating devices of the embodiments of FIGS. 1A and 4A can be disposed at different positions, so more shadows can be formed. Consequently, the coordinate locating devices of the embodiments are able to locate the coordinates of single or multiple objects, thus having broader applications than conventional coordinate locating devices.

While certain embodiments have been described above, it will be understood that the embodiments described are by way of example only. Accordingly, the devices and methods described herein should not be limited to the described embodiments. Rather, the devices and methods described herein should only be limited in light of the claims that follow when taken in conjunction with the above descriptions and accompanying drawings.

The invention claimed is:

1. A coordinate locating device for locating an object intruding an area monitored by a display apparatus, comprising: a light source configured to emit light, wherein the light source comprises a light emitting device; at least one reflector configured to reflect the light from the light source, each of the at least one reflector being a diffusive reflector configured to diffusively reflect the light from the light source; and a single detector configured to detect the light reflected by the at least one reflector and to detect at least two a shadows appearing on said reflector, a first shadow being caused by an object intruding an area monitored by the display apparatus and blocking the light from the light source and a second shadow being caused by the object intruding an area monitored by the display apparatus and blocking the diffused light from the diffusive reflector, wherein the light source and the single detector are disposed at different positions on the same edge of the coordinate locating device.

2. The coordinate locating device of claim 1, wherein the distance between the light source and the single detector is substantially larger than 2 cm along the direction of the edge.

3. The coordinate locating device of claim 1, further comprising another light source disposed at a different position from that of the light source and that of the single detector.

4. The coordinate locating device of claim 3, wherein the distance between the another light source and the single detector is substantially larger than 2 cm along the direction of the edge.

5. The coordinate locating device of claim 1, further comprising an interface connectable to the display apparatus.

6. The coordinate locating device of claim 1, wherein the coordinates of an object intruding the coordinate locating device are located according to shadows of the object appearing on the at least one reflector and detected by the single detector.

7. The coordinate locating device of claim 1, wherein said light emitting device comprises one of an infrared light emitting diode and a laser source.

8. The coordinate locating device of claim 7, wherein the light source further comprises a light shaping device configured to shape the light emitted from the light emitting device.

9. The coordinate locating device of claim 8, wherein the light shaping device includes one or more scanning mirror, one or more lens, or one or more diffractive optical elements.

10. The coordinate locating device of claim 1, wherein the single detector comprises an image sensor, a camera, or a photodiode.

11. A display apparatus comprising the coordinate locating device of claim 1 and a display panel, wherein the coordinate locating device is arranged surrounding the display panel.

12. A coordinate locating method for a coordinate locating device having a light source, at least one diffusive reflector configured to diffusively reflect the light from the light source, and a single detector adapted to detect a shadow appearing on said reflector, the method comprising: obtaining a first line between the light source and a first shadow cast by an object intruding the coordinate locating device and appearing on the at least one reflector; obtaining a second line between the single detector and a second shadow cast by the object and appearing on the at least one reflector; and locating the coordinates of the object at a cross point of the first and second lines.

13. A coordinate locating method for a coordinate locating device having a first light source, a second light source, at least one diffusive reflector configured to diffusively reflect the light from the light source, and a single detector adapted to detect a shadow appearing on said reflector, the method comprising: simultaneously turning on the first and second light sources to detect shadows cast by an object intruding the coordinate locating device and appearing on the at least one reflector; obtaining at least two lines of a plurality of lines, wherein each of the plurality of lines is between one of the first and second light sources and the single detector, and one of the detected shadows; and determining the coordinates of the object to be at a cross point of the at least two lines.

14. The coordinate locating method of claim 13, wherein the plurality of lines comprise: a first line located between the first light source and a first shadow among the detected shadows that is most adjacent to the second light source; a second line located between the second light source and a second shadow among the detected shadows that is most adjacent to the first light source; and a third line located between the single detector and the shadows among the detected shadows other than the first and second shadows.

15. A coordinate locating method for a coordinate locating device having a first light source, a second light source, at least one diffusive reflector configured to diffusively reflect the light from the light source, and a single detector adapted to detect a shadow appearing on said reflector, the method comprising: simultaneously turning on the first and second light sources to detect a plurality of shadows cast by at least two objects intruding the coordinate locating device and appearing on the at least one reflector; obtaining a first group of lines according to a first group of shadows among the plurality of shadows; obtaining a second group of lines according to a second group of shadows different from the first group of shadows among the plurality of shadows; locating a group of possible coordinates according to the first and second groups of lines; obtaining a third group of lines according to the second group of lines and the group of possible coordinates; and determining the coordinates of the at least two objects by the third group of lines.

16. The coordinate locating method of claim 15, wherein the first group of lines includes: one line located between the first light source and a shadow, among the plurality of shadows, that is most adjacent to second light source; and one line located between the second light source and a shadow, among the plurality of shadows, that is most adjacent to the first light source.

17. The coordinate locating method of claim 15, wherein each of the lines in the second group of lines is located between the single detector and one of the shadows in the second group of shadows.

18. The coordinate locating method of claim 17, wherein the possible coordinates include a first cross point of the first group of lines, and a plurality of second cross points of the first and second groups of lines.

19. The coordinate locating method of claim 18, wherein obtaining a third group of lines according to the second group of lines and the group of possible coordinates comprises: determining whether the first cross point is the location of one of the at least two objects by checking whether the first cross point lies on any of the second group of lines; and if affirmative, obtaining the third group of lines including at least two lines that do not cross the first cross point; if negative, obtaining the third group of lines including a first line extended from one of the first and second light sources, across one of the second cross points, to one of the second group of shadows; and a second line extended from the other of the first and second light sources, across another of the second cross points, to another of the second group of shadows.

20. The coordinate locating method of claim 19, wherein determining the coordinates of the at least two objects to be at two coordinates of the group of possible coordinates by the third group of lines comprises: if the first cross point is determined to be the location of one of the two objects, determining the coordinates of another of the at least two objects to be at a cross point of at least two lines of the third group of lines; and if the first cross point is not determined to be the location of one of the two objects, determining the coordinates of the at least two objects to be the possible combination of two points located on the first and second lines.

21. The coordinate locating method of claim 20, wherein obtaining the third group of lines comprises: obtaining a plurality of possible combinations of two points from the plurality of second cross points; obtaining two respective lines for each of the possible combinations by linking the first and second light sources respectively across the two points in each of the possible combinations; checking for each possible combination whether the two respective lines cross two shadows among the second group of shadows; and determining the third group of lines to include the two respective lines crossing two shadows among the second group of shadows.

22. A coordinate locating method for a coordinate locating device having a first light source, a second light source, at least one diffusive reflectors configured to diffusively reflect the light from the light source, and a single detector adapted to detect a shadow appearing on said reflector, the method comprising: turning on the first and second light sources by turns to respectively detect a first group of shadows and a second group of shadows cast by one or more objects intruding the coordinate locating device and appearing on the at least one reflector; obtaining a first group of lines according to the first group of shadows; obtaining a second group of lines according to the second group of shadows; determining the one or more coordinates of the one or more objects according to the respective number of shadows in the first and second groups of shadows and the first and second group of lines.

23. The coordinate locating method of claim 22, wherein determining the one or more coordinates of the one or more objects is further according to the number of common shadows of the first and second groups of shadows.

24. The coordinate locating method of claim 22, wherein the first group of lines include a first line located between the first light source and a first shadow among the first group of shadows that is most adjacent to the second light source, and the second group of lines includes a second line located between the second light source and a second shadow among the second group of shadows that is most adjacent to the first light source.

25. The coordinate locating method of claim 24, wherein when the number of shadows in each of the first and second groups of shadows is two, determining the one or more coordinates of the one or more objects comprises locating the coordinates of an object at a cross point of at least two of the first and second groups of lines.

26. The coordinate locating method of claim 24, wherein when the number of each of the first and second groups of shadows is four, determining the one or more coordinates of the one or more objects comprises: determining whether a first cross point is the coordinates of one of the objects by checking whether the first cross point lies on either of a third line or a fourth line, wherein the first cross point is the cross point of the first and second lines, the third line is located between the single detector and a shadow among the first group of shadows that is most adjacent to the first light source, and the fourth line is located between the single detector and a shadow among the second group of shadows that is most adjacent to the second light source; if affirmative, determining the coordinates of another of the objects to be at a second cross point of lines that do not cross the first cross point; and if negative, determining the coordinates of the objects to be at two of the cross points of the first and second groups of lines that are located between the first cross point and the second shadow and between the first cross point and the first shadow, respectively.

* * * * *